United States Patent
Lee et al.

(10) Patent No.: US 11,006,030 B2
(45) Date of Patent: May 11, 2021

(54) METHOD AND ELECTRONIC DEVICE FOR ACQUIRING IMAGE BY USING CAMERA COMPRISING DRIVING APPARATUS CAPABLE OF ROTATING MIRROR

(71) Applicant: Samsung Electronics Co., Ltd., Gyeonggi-do (KR)

(72) Inventors: Jinwon Lee, Gyeonggi-do (KR); Kwang Seok Byon, Gyeonggi-do (KR); Kiwoo Lee, Gyeonggi-do (KR); Chongsam Chung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/637,044

(22) PCT Filed: Aug. 2, 2018

(86) PCT No.: PCT/KR2018/008792
§ 371 (c)(1),
(2) Date: Feb. 6, 2020

(87) PCT Pub. No.: WO2019/031764
PCT Pub. Date: Feb. 14, 2019

(65) Prior Publication Data
US 2020/0244854 A1 Jul. 30, 2020

(30) Foreign Application Priority Data

Aug. 10, 2017 (KR) .................. 10-2017-0101409

(51) Int. Cl.
*H04N 5/225* (2006.01)
*G06T 7/11* (2017.01)
*H04N 5/232* (2006.01)

(52) U.S. Cl.
CPC ............. *H04N 5/2259* (2013.01); *G06T 7/11* (2017.01); *H04N 5/2254* (2013.01);
(Continued)

(58) Field of Classification Search
CPC ........... H04N 5/2259; H04N 5/232945; H04N 5/2254; H04N 5/2258; H04N 5/23238; G06T 7/11
See application file for complete search history.

(56) References Cited

U.S. PATENT DOCUMENTS 6,320,610 B1  11/2001  Van Sant et al.
8,442,392 B2  5/2013   Ollila et al.
(Continued)

FOREIGN PATENT DOCUMENTS

JP   11-205641 A    7/1999
JP   2002-290810 A  10/2002
JP   2010-166229 A  7/2010

OTHER PUBLICATIONS

Sankyo "TiltAC" presentation, Jun. 2, 2015. pp. 1-12.
Lin, Jason, Using dual cameras to realize DSLR image quality and performance in smart phone.

*Primary Examiner* — Mishawn N. Hunter
(74) *Attorney, Agent, or Firm* — Cha & Reiter, LLC

(57) ABSTRACT

Various embodiments of the disclosure relate to an electronic device and a method of acquiring an image of the electronic device. The electronic device may include a first camera, a second camera which includes an image sensor, a mirror for transferring light incident from the outside to the image sensor, and a driving device capable of rotating the mirror in at least one direction along at least one rotation axis, and which has a view angle smaller than a view angle of the first camera, and at least one processor. The at least one processor may be configured to acquire a first image including one or more external objects by using the first (Continued)

camera, select at least some objects of the one or more external objects included in the first image or at least some regions of the first image, and acquire a second image in a state where the mirror is rotated by the driving device such that the view angle of the second camera is moved to a location corresponding to the selected at least some objects or at least some regions. Various other embodiments are also possible.

17 Claims, 24 Drawing Sheets

(52) U.S. Cl.
CPC ....... *H04N 5/2258* (2013.01); *H04N 5/23238* (2013.01); *H04N 5/232945* (2018.08); *G06T 2207/20132* (2013.01)

(56) References Cited

U.S. PATENT DOCUMENTS

| | | |
|---|---|---|
| 2002/0067426 A1 | 6/2002 | Nagata et al. |
| 2014/0160242 A1 | 6/2014 | An |
| 2015/0042870 A1 | 2/2015 | Chan et al. |
| 2015/0124108 A1 | 5/2015 | Wade et al. |
| 2016/0182821 A1 | 6/2016 | Shabtay et al. |
| 2016/0266400 A1 | 9/2016 | Chan et al. |

METHOD AND ELECTRONIC DEVICE FOR ACQUIRING IMAGE BY USING CAMERA COMPRISING DRIVING APPARATUS CAPABLE OF ROTATING MIRROR

CLAIM OF PRIORITY

This application is a National Phase Entry of PCT International Application No. PCT/KR2018/008792, which was filed on Aug. 2, 2018 and claims a priority to Korean Patent Application No. 10-2017-0101409, which was filed on Aug. 10, 2017, the contents of which are incorporated herein by reference.

TECHNICAL FIELD

Various embodiments of the disclosure relate to a method of acquiring an image by using a camera including a mirror rotatable by means of a driving device, and an electronic device thereof.

BACKGROUND ART

Electronic devices (e.g., a mobile terminal, a smartphone, a wearable electronic device, etc.) may provide various functions. For example, the smartphone may provide short-range wireless communication (Bluetooth, Wireless Fidelity (Wi-Fi), Near Field Communication (NFC), etc.), mobile communication ($3^{rd}$ Generation (3G), $4^{th}$ Generation (4G), $5^{th}$ Generation (5G), etc.), a music or video playback function, an image capturing function, a navigation function, a messenger function, or the like.

Recently, there is a growing interest in a pan-tilt camera capable of tracking a subject. The camera needs to be capable of moving a view angle to provide a subject tracking function. In general, the camera may move the view angle by using a module rotation scheme for rotating a camera module as a whole or a mirror rotation scheme for rotating a mirror located inside the camera module to transfer light to an image sensor by changing an axis (an optical axis) of incident light.

DISCLOSURE OF INVENTION

Technical Problem

In the module rotation scheme which provides the pan-tilt function by rotating the camera module as a whole, a large mounting space is required since a rotation radius of the camera module shall be ensured. Thus, it may be difficult to apply the scheme to a latest slim-sized electronic device (e.g., a smartphone).

Meanwhile, in the mirror rotation scheme which provides the pan-tilt function by rotating the mirror, it may be difficult to make the camera module slim since a rotation space shall be secured for the mirror. In addition, the mirror rotation scheme may cause an image distortion phenomenon since only the mirror rotates without rotation of an image sensor.

Various embodiments of the disclosure for solving the aforementioned problems can make a camera module slim by decreasing a size of a mirror in the camera module based on a mirror rotation scheme.

In addition, various embodiments of the disclosure can compensate for image distortion caused by rotation of a mirror.

In addition, various embodiments of the disclosure can provide a hand shaking compensation function and a gimbal function by using rotation of a mirror.

In addition, various embodiments of the disclosure can effectively capture a panoramic photo by properly rotating a mirror, based on a movement speed and/or movement direction of an electronic device.

Solution to Problem

An electronic device according to various embodiments of the disclosure may include a first camera, a second camera which includes an image sensor, a mirror for transferring light incident from the outside to the image sensor, and a driving device capable of rotating the mirror in at least one direction along at least one rotation axis, and which has a view angle smaller than a view angle of the first camera, and at least one processor. The at least one processor may be configured to acquire a first image including one or more external objects by using the first camera, select at least some objects of the one or more external objects included in the first image or at least some regions of the first image, and acquire a second image in a state where the mirror is rotated by the driving device such that the view angle of the second camera is moved to a location corresponding to the selected at least some objects or at least some regions.

A method of acquiring an image of an electronic device according to various embodiments of the disclosure may include acquiring a first image including at least one external object by using a first camera having a first view angle, sensing selection of at least some objects of at least one external object included in the first image or at least some regions of the first image, and acquiring a second image in a state where the mirror rotates so that a second view angle of a second camera having a second view angle smaller than the first angle and including a mirror rotatable in at least one direction faces a location corresponding to the selected at least some objects or at least some regions.

A camera device according to various embodiments of the disclosure may include a mirror which changes a path of light incident from the outside, a driving device configured to rotate the mirror in at least one direction along at least one rotation axis, at least one lens for collecting light reflected via the mirror, a light splitting element which passes a first part of the light incident through the at least one lens and reflects a second part, a first image sensor disposed on a movement path of light of the first part to receive the first part, and a second image sensor disposed on a movement path of the second part to receive the second part and configured to receive light of a wavelength at least different from that of the first image sensor.

Advantageous Effects of Invention

Various embodiments of the disclosure can constitute a camera based on a mirror rotation scheme as a multi-camera including a color (RGB) camera and a mono camera, thereby minimizing a mirror size and realizing slimness. In addition, the multi-camera according to an embodiment of the disclosure can share a lens, a mirror, or the like, thereby decreasing a mounting space.

In addition, various embodiments of the disclosure can avoid an image loss by compensating for image rotation caused by rotation of a mirror.

In addition, various embodiments of the disclosure can provide a hand shaking compensation function and a gimbal function by controlling rotation of a mirror without an additional hand shaking compensation device.

In addition, various embodiments of the disclosure can prevent at least part of images from being superimposed (overlapping) or prevent an uncaptured region from being produced, by properly rotating a mirror on the basis of a movement speed and/or movement direction of an electronic device when panoramic capturing is performed.

BEST MODE FOR CARRYING OUT THE INVENTION

Figure 1:
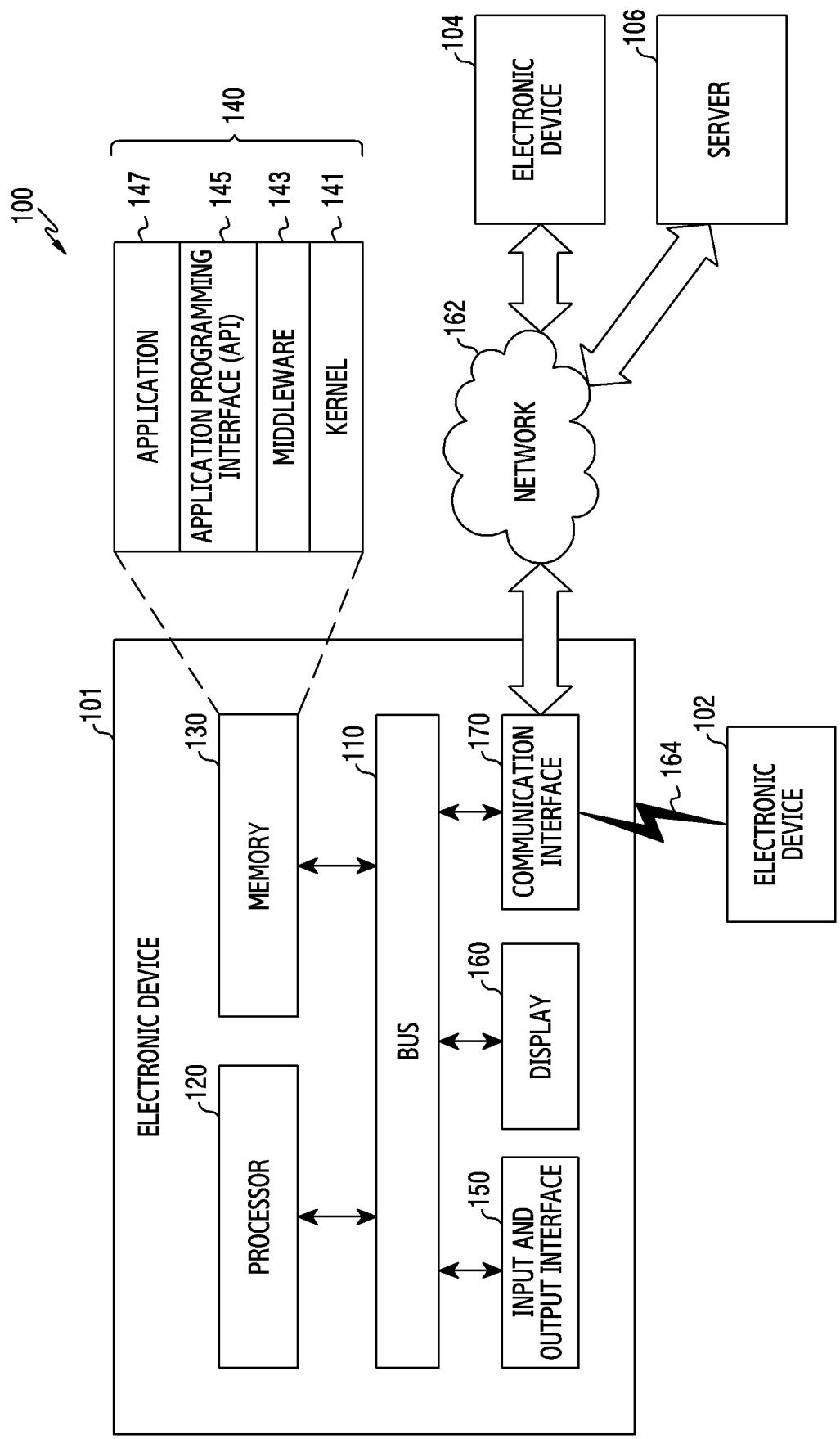
FIG. 1 illustrates a network environment including an electronic device according to various embodiments of the disclosure.

Various embodiments of the present disclosure are described in greater detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure. The terms used herein are defined in consideration of functions of the present disclosure and may vary depending on a user's or an operator's intention and usage. Therefore, the terms used herein should be understood based on the descriptions made herein. It is to be understood that the singular forms "a," "an," and "the" also include plural referents unless the context clearly dictates otherwise. In the present disclosure, an expression such as "A or B," "at least one of A and B" or "one or more of A and B" may include all possible combinations of the listed items. Expressions such as "first," "second," "primarily," or "secondary," as used herein, may represent various elements regardless of order and/or importance, and do not limit the corresponding elements. The expressions may be used for distinguishing one element from another element. When it is described that an element (such as a first element) is operatively or communicatively "coupled to" or "connected to" another element (such as a second element), the element may be directly connected to the other element or may be connected through another element (such as a third element).

The expression "configured (or set) to", as used in the present disclosure, may be used interchangeably with, for example, "suitable for," "having the capacity to," "designed to," "adapted to," "made to," or "capable of", according to the situation. The term "configured (or set) to" does not only refer to "specifically designed to" in hardware. Alternatively, in some situations, the expression "apparatus configured to" may refer to a situation in which the apparatus "may" operate together with another apparatus or component. The phrase "a processor configured (or set) to perform A, B, and C" may be a dedicated processor, a general-purpose processor (such as a central processing (CPU) or an application processor (AP)) that may perform a corresponding operation by executing at least one software program stored in a dedicated processor (such as an embedded processor) for performing a corresponding operation or in a memory device.

An electronic device, according to an embodiment of the present disclosure, may be for example, at least one of a smart phone, a tablet PC, a mobile phone, a video phone, an e-book reader, a desktop PC, a laptop PC, a notebook computer, a workstation, a server, a PDA, a portable multimedia player (PMP), an MPEG 3 (MP3) player, medical equipment, a camera, and a wearable device, and the like, but is not limited thereto. The wearable device may include at least one of an accessory type (e.g., a watch, a ring, a bracelet, an ankle bracelet, a necklace, eyeglasses, a contact lens, or a head-mounted-device (HMD)), a fabric or clothing embedded type (e.g., electronic garments), a body attachable type (e.g., a skin pad or a tattoo), and an implantable circuit, and the like, but is not limited thereto. The electronic device may be at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box, an electronic dictionary, an electronic key, a camcorder, and an electronic frame, and the like, but is not limited thereto.

In an embodiment of the present disclosure, the electronic device may be at least one of various medical devices (such as, various portable medical measuring devices (a blood sugar level measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, and an ultrasonic wave device), a navigation device, a global navigation satellite system (GNSS), an event data recorder (EDR), a flight data recorder (FDR), a vehicle infotainment device, electronic equipment for a ship (such as, a navigation device for a ship and a gyro compass), avionics, a security device, a head unit for a vehicle, an industrial or home robot, a drone, an automated teller machine (ATM), a point of sales (POS) device, and an Internet of things (IoT) device (e.g., a light bulb, various sensors, a sprinkler device, a fire alarm, a thermostat, a street light, a toaster, sports equipment, a hot water tank, a heater, and a boiler), and the like, but is not limited thereto. According to an embodiment of the present disclosure, the electronic device may be at least one of a portion of furniture, building/construction or vehicle, an electronic board, an electronic signature receiving device, a projector, and various measuring devices (e.g., water supply, electricity, gas, or electric wave measuring device), and the like, but is not limited thereto. An electronic device may be a flexible electronic device or a combination of two or more of the foregoing various devices. An electronic device is not limited to the foregoing devices, and may be embodied as a newly developed electronic device. The term "user", as used herein, may refer to a person using an electronic device or a device using an electronic device (e.g., an artificial intelligence electronic device).

FIG. 1 is a block diagram of an electronic device in a network environment, according to an embodiment of the present disclosure.

Referring to FIG. 1, the electronic device 101 in the network environment 100 is described. The electronic device 101 includes a bus 110, a processor 120, a memory 130, an input/output interface 150, a display 160, and a communication interface 170. The electronic device 101 may be provided without at least one of the components, or may include at least one additional component. The bus 110 may include a circuit for connecting the components 120 through 170 and delivering communication signals (e.g., control messages or data) therebetween. The processor 120 may include one or more of a CPU, an AP, and a communication processor (CP). The processor 120, for example, may perform an operation or data processing with respect to control and/or communication of at least another component of the electronic device 101.

The memory 130 may include a volatile and/or nonvolatile memory. The memory 130, for example, may store commands or data relating to at least another component of the electronic device 101. According to an embodiment of the present disclosure, the memory 130 may store software and/or a program 140. The program 140 includes, for example, a kernel 141, middleware 143, an application programming interface (API) 145, and/or an application program (or applications) 147. At least part of the kernel 141, the middleware 143, or the API 145 may be referred to as an operating system (OS). The kernel 141 may control or manage system resources (e.g., the bus 110, the processor 120, or the memory 130) used for performing operations or functions implemented by the other programs (e.g., the middleware 143, the API 145, or the applications 147). Additionally, the kernel 141 may provide an interface for controlling or managing system resources by accessing an individual component of the electronic device 101 from the middleware 143, the API 145, or the applications 147.

The middleware 143, for example, may serve an intermediary role for exchanging data between the API 145 or the applications 147 and the kernel 141 through communication. Additionally, the middleware 143 may process one or more job requests received from the applications 147, based on their priority. The middleware 143 may assign a priority for using a system resource (e.g., the bus 110, the processor 120, or the memory 130) of the electronic device 101 to at least one of the applications 147, and process the one or more job requests. The API 145, as an interface through which the applications 147 controls a function provided from the kernel 141 or the middleware 143, may include, for example, at least one interface or function (e.g., an instruction) for file control, window control, image processing, or character control. The input/output interface 150, for example, may deliver commands or data input from a user or another external device to other component(s) of the electronic device 101, or output commands or data input from the other component(s) of the electronic device 101 to the user or another external device.

The display 160, for example, may include a liquid crystal display (LCD), a light emitting diode (LED) display, an organic light emitting diode (OLED) display, a microelectromechanical systems (MEMS) display, or an electronic paper display, and the like, but is not limited thereto. The display 160, for example, may display various content (e.g., texts, images, videos, icons, and/or symbols) to the user. The display 160 may include a touch screen, for example, and receive touch, gesture, proximity, or hovering inputs by using an electronic pen or a user's body part. The communication interface 170, for example, may set communications between the electronic device 101 and an external device (e.g., a first external electronic device 102, a second external electronic device 104, or a server 106. The communication interface 170 may communicate with the second external electronic device 104 or the server 106 over a network 162 through wireless communication or wired communication.

The wireless communication, for example, may include cellular communication using at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communication may include, for example, such as element 164 of FIG. 1, at least one of wireless fidelity (Wi-Fi), light fidelity (Li-Fi), Bluetooth™, Bluetooth™ low energy (BLE), Zigbee, near field communication (NFC), magnetic secure transmission, radio frequency (RF), and body area network (BAN). The wireless communication may include GNSS. The GNSS may include, for example, global positioning system (GPS), global navigation satellite system (GLONASS), Beidou navigation satellite system (Beidou), or Galileo (the European global satellite-based navigation system). Hereafter, the term GPS may be interchangeably used with the term GNSS. The wired communication, for example, may include at least one of universal serial bus (USB), high definition multimedia interface (HDMI), recommended standard 232 (RS-232), power line communications, and plain old telephone service (POTS). The network 162 may include a telecommunications network, for example, at least one of a computer network (e.g., LAN or WAN), the Internet, and a telephone network.

Each of the first and second external electronic devices 102 and 104 may be of the same type or of a different type from that of the electronic device 101. According to an embodiment of the present disclosure, all or part of operations executed in the electronic device 101 may be executed by another electronic device or a plurality of electronic devices (e.g., the electronic device 102 or 104, or the server 106). To perform a function or service automatically or by request, instead of performing the function or the service by the electronic device 101, the electronic device 101 may request at least part of a function relating thereto from the electronic device 102 or 104, or the server 106. The electronic device 102 or 104, or the server 106 may perform the requested function or an additional function and send its result to the electronic device 101. The electronic device 101 may provide the requested function or service by processing the received result. In doing so, for example, cloud computing, distributed computing, or client-server computing techniques may be used.

Figure 2A:
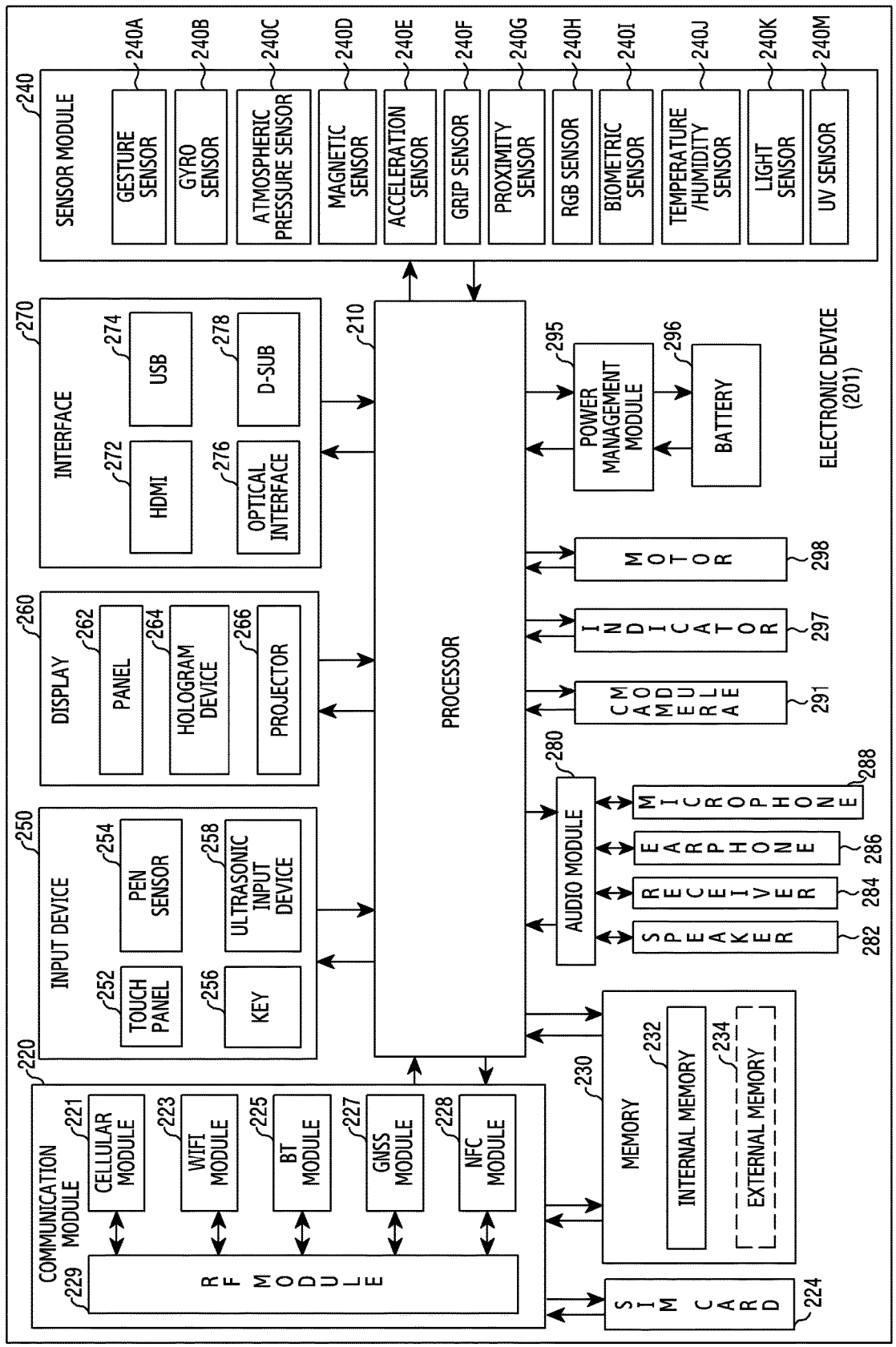
FIG. 2A is a block diagram of an electronic device according to various embodiments.

FIG. 2 is a block diagram of an electronic device, according to an embodiment of the present disclosure. The electronic device 201, for example, may include all or part of the above-described electronic device 101 of FIG. 1. The electronic device 201 includes one or more processors (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210, for example, may control a plurality of hardware or software components connected to the processor 210, and also may perform various data processing and operations by executing an OS or an application program. The processor 210 may be implemented with a system on chip (SoC), for example. The processor 210 may further include a graphic processing unit (GPU) and/or an image signal processor. The processor 210 may include at least part (e.g., a cellular module 221) of the components illustrated in FIG. 2. The processor 210 may load commands or data received from at least one other component (e.g., a nonvolatile memory) into a volatile memory, process the commands, and store various data in the nonvolatile memory.

The processor 210 may control operations related to capturing of a still image or a moving image by using the camera module 291 of the electronic device 201. According to various embodiments of the disclosure, the processor 210 may control (e.g., move) a view angle of the camera module 291. For example, the processor 210 may move the view angle by rotating a mirror included in the camera module 291 in at least one direction. The processor 210 may control the view angle of the camera module 291 to track a subject. According to some embodiments, the processor 210 may compensate for image distortion caused by rotation of the mirror. According to another embodiment, the processor 210 may provide a hand shaking compensation function, a pan-tilt function, and/or a gimbal function by using rotation of the mirror. According to another embodiment, the processor 210 may control rotation of the mirror to uniformly acquire at least one image for producing a panoramic photo by considering a movement direction and/or movement speed of the electronic device when capturing the panoramic photo. Detailed descriptions on the processor 210 will be described below.

The communication module 220 may have the same or similar configuration as the communication interface 170 of FIG. 1. The communication module 220 may include, such as, the cellular module 221, a Wi-Fi module 223, a Bluetooth™ (BT) module 225, a GNSS module 227, an NFC module 228, and an RF module 229. The cellular module 221, for example, may provide voice call, video call, short message service (SMS), or Internet service through a communication network. The cellular module 221 may identify and authenticate the electronic device 201 in a communication network by using the SIM 224. The cellular module 221 may perform at least part of a function that the processor 210 provides. The cellular module 221 may further include a CP. At least some (e.g., two or more) of the cellular module 221, the Wi-Fi module 223, the BT module 225, the GNSS module 227, and the NFC module 228 may be included in one integrated circuit (IC) or an IC package. The RF module 229, for example, may transmit/receive a communication signal (e.g., an RF signal). The RF module 229, for example, may include a transceiver, a power amp module (PAM), a frequency filter, a low noise amplifier (LNA), or an antenna. At least one of the cellular module 221, the Wi-Fi module 223, the BT module 225, the GNSS module 227, and the NFC module 228 may transmit/receive an RF signal through an additional RF module. The SIM 224, for example, may include a card or an embedded SIM, and also may contain unique identification information (e.g., an integrated circuit card identifier (ICCID)) or subscriber information (e.g., an international mobile subscriber identity (IMSI)).

The memory 230 (e.g., the memory 130) may include at least one of an internal memory 232 or an external memory 234. The internal memory 232 may include at least one of, for example, a volatile memory (e.g., dynamic RAM (DRAM), static RAM (SRAM), or synchronous dynamic RAM (SDRAM)), and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory, hard drive, and solid state drive (SSD)). The external memory 234 may include flash drive, for example, compact flash (CF), secure digital (SD), micro SD, mini SD, extreme digital (xD), multi-media card (MMC), or memory stick. The external memory 234 may be functionally or physically connected to the electronic device 201 through various interfaces.

The memory 230 may be located inside a housing of the electronic device 201, and may be operatively or electrically coupled with the processor 210. The memory 230 may store various programs, and may store data, which is generated while performing the various programs, or downloaded data or the like. The memory 230 may store various commands and/or instructions for operating the processor 210.

According to various embodiments of the disclosure, the memory 230 may store various programs for controlling operations related to capturing of a still image and moving image of the camera module 291 of the electronic device 201. For example, the memory 230 may store a program for controlling movement of a view angle of the camera module 291 to track a subject, a program for compensating for image distortion caused by rotation of the mirror, a program for providing a hand shaking compensation function, pan-tilt function, and/or gimbal function by using rotation of the mirror, a program for controlling rotation of the mirror when a panoramic photo is captured, or the like.

The sensor module 240 may, for example, measure physical quantities or detect an operating state of the electronic device 201, and convert the measured or detected information into electrical signals. The sensor module 240 includes at least one of a gesture sensor 240A, a gyro sensor 240B, an atmospheric pressure sensor 240C, a magnetic sensor 240D, an acceleration sensor 240E, a grip sensor 240F, a proximity sensor 240D a color sensor 240H (e.g., a red, green, blue (RGB) sensor). The sensor module 240 may also include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor therein. The electronic device, as part of the processor 210 or individually, may further include a processor configured to control the sensor module 240 and control the sensor module 240 while the processor 210 is sleeping.

The sensor module 240 may sense shaking of the electronic device 201 (e.g., hand shaking). For example, the sensor module 240 may transfer, to the processor 210, sensing information (e.g., a sensor value) based on shaking in at least one direction among yaw, pitch, and roll of the electronic device 201 when capturing a photo or a moving image. According to some embodiments, the sensor module 240 may transfer, to the processor 210, sensing information (e.g., a sensor value) measured or sensed based on movement (e.g., a movement direction, a movement speed, shaking, etc.) of the electronic device 201 when capturing a panoramic photo.

The input device 250, for example, may include at least one of a touch panel 252, a (digital) pen sensor 254, a key 256, and an ultrasonic input device 258. The touch panel 252 may use at least one of, for example, capacitive, resistive, infrared, and ultrasonic methods. Additionally, the touch panel 252 may further include a control circuit. The touch panel 252 may further include a tactile layer to provide a tactile response to a user. The (digital) pen sensor 254 may include, for example, part of a touch panel or a sheet for recognition. The key 256 may include, for example, a physical button, a touch key, an optical key, or a keypad. The ultrasonic input device 258 may detect ultrasonic waves from a microphone 288 and check data corresponding to the detected ultrasonic waves.

The display 260 (e.g., the display 160) may include at least one of a panel 262, a hologram device 264, a projector 266, and/or a control circuit for controlling them. The panel 262 may be flexible, transparent, or wearable, for example. The panel 262 and the touch panel 252 may be configured with one or more modules. The panel 262 may include a pressure sensor (or a force sensor) for measuring a pressure of the user touch. The pressure sensor may be integrated with the touch panel 252, or include one or more sensors separately from the touch panel 252. The hologram device 264 may show three-dimensional images in the air by using the interference of light. The projector 266 may display an image by projecting light on a screen. The screen, for example, may be placed inside or outside the electronic device 201. The interface 270, for example, may include an HDMI 272, a USB 274, an optical interface 276, or a D-subminiature (D-sub) 278. The interface 270 may be included in, for example, the communication interface 170 of FIG. 1. Additionally or alternatively, the interface 270 may include a mobile high-definition link (MHL) interface, a SD card/MMC interface, or an infrared data association (IrDA) standard interface.

The display 260 may display various user interfaces to control capturing of the photo or the moving image using a plurality of cameras. For example, the display 260 may display a preview image acquired via the camera module 291. According to some embodiments, the display 260 may display at least one of a plurality of images acquired via the plurality of cameras each having a different view angle in various manners (e.g., Picture By Picture (PBP), Picture In Picture (PIP), multi-view, etc.). Detailed descriptions thereof will be described below with reference to FIG. 5A to FIG. 5C.

The audio module 280, for example, may convert sounds into electrical signals and convert electrical signals into sounds. At least some components of the audio module 280 may be included in, for example the input/output interface 150 of FIG. 1. The audio module 280 may process sound information input or output through a speaker 282, a receiver 284, an earphone 286, or the microphone 288.

The camera module 291, as a device for capturing still images (e.g., photos, panoramic photos) and videos, may include one or more image sensors (e.g., a front sensor or a rear sensor), a lens, an image signal processor (ISP), or a flash (e.g., an LED or a xenon lamp).

The camera module 291 according to an embodiment of the disclosure may include at least one camera capable of moving a view angle. For example, as shown in FIG. 2B, the camera module 291 may include a first camera having a first view angle and incapable of moving a first view angle and a second camera having a second view angle smaller than the first angle and capable of moving the second view angle.

Figure 2B:
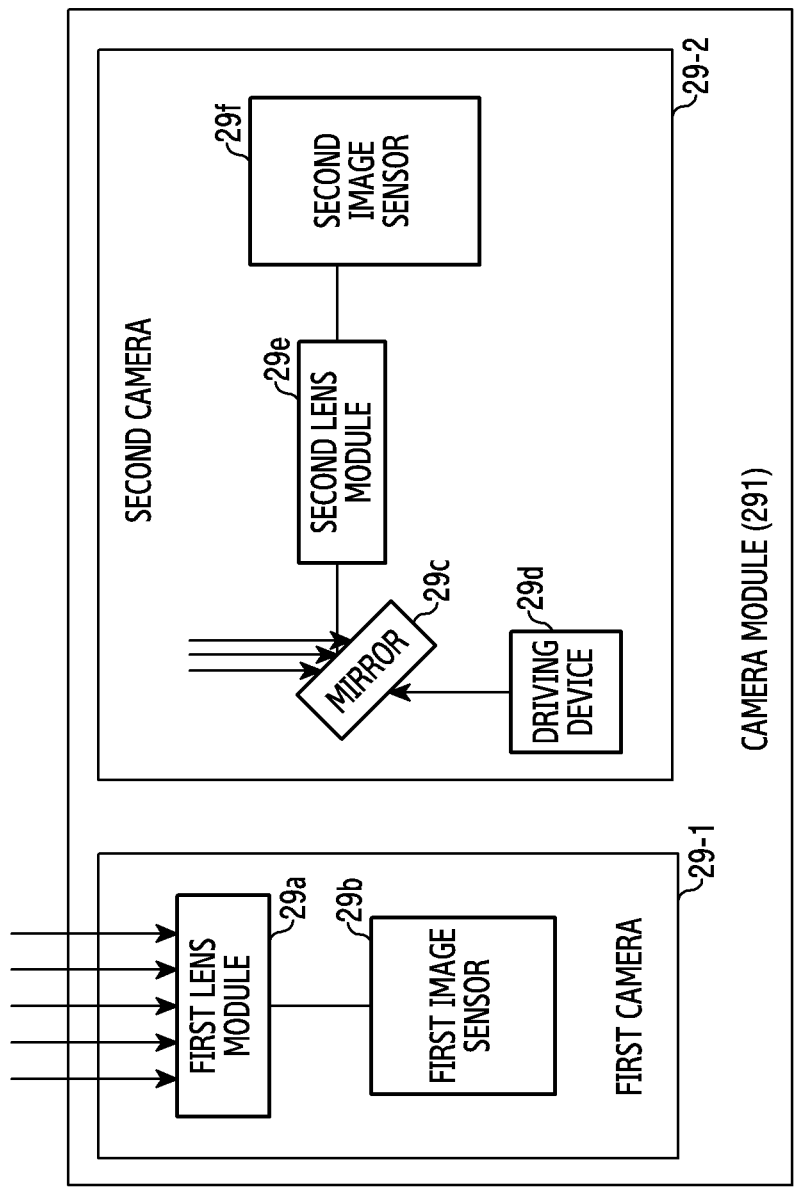
FIG. 2B is a block diagram of a camera module.

Referring to FIG. 2B, a first camera 29-1 may include a first lens module 29a and a first image sensor 29b. The first lens module 29a may include at least one lens which collects or diffuses incident light. The first lens module 29a may be a wide-angle lens. The first image sensor 29b may convert light incident via the first lens module 29a into image data. Although it is illustrated in FIG. 2B that the first camera 29-1 is a mirrorless camera, according to some embodiments, the first camera 29-1 may further include a mirror (not shown) which transfers (e.g., reflects) light incident from the outside to the first image sensor 29b.

A second camera 29-2 may include a mirror 29c, a driving device 29d, a second lens module 29e, and a second image sensor 29f. The mirror 29c may transfer light incident from the outside to the second image sensor 29f. The driving device 29d may rotate the mirror 20c in at least one direction according to at least one rotation axis. The second lens module 29e may collect or diffuse light reflected from the mirror 29c. The lens module 29e may be a telephoto lens. The second image sensor 29f may convert light incident via the second lens module 29e into image data of a configured size. The second image sensor 29f may change the size of image data in accordance with rotation of the mirror 29c. Detailed descriptions thereof will be described below with reference to FIG. 10 and FIG. 11.

According to some embodiments, the camera module 291 may include a first camera having a first view angle and a second camera having a second view angle and capable of moving the view angle. The first view angle may be greater than the second view angle. For example, the first camera may be a wide-angle camera having a view angle greater than or equal to 60 degrees, and the second camera may be a telephoto camera having a view angle less than or equal to 30 degrees. For another example, the first camera may be a wide-angle camera, and the second camera may be a standard camera having a view angle of about 50 degrees. For another example, the first camera may be a standard camera, and the second camera may be a telephoto camera. View angles of the aforementioned wide-angle camera, standard camera, and telephoto camera are only one example generally used in the technical field of the disclosure, and various embodiments of the disclosure are not limited thereto.

According to some embodiments, the camera module 291 may include at least one first camera having a first view angle or may include at least one second camera having a second view angle and capable of moving the view angle.

According to some embodiments, the first camera 29-1 and the second camera 29-2 may be constructed as one camera module 291.

According to some embodiments, at least one of the first camera 29-1 and the second camera 29-2 may be implemented as a multi-camera including a color (RGB) camera and a mono camera. Herein, implementing the first camera or the second camera as the multi-camera including the RGB camera and the mono camera is a well-known technique in the technical field in the disclosure, and thus detailed descriptions thereof will be omitted.

The power management module 295, for example, may manage the power of the electronic device 201. According to an embodiment of the present disclosure, the power management module 295 may include a power management IC (PMIC), a charger IC, or a battery gauge, for example. The PMIC may have a wired and/or wireless charging method. The wireless charging method may include, for example, a magnetic resonance method, a magnetic induction method, or an electromagnetic method, and may further include an additional circuit for wireless charging, for example, a coil loop, a resonant circuit, or a rectifier circuit. The battery gauge may measure the remaining charge capacity of the battery 296, or a voltage, current, or temperature of the battery 296 during charging. The battery 296 may include, for example, a rechargeable battery and/or a solar battery.

The indicator 297 may display a specific state of the electronic device 201 or part thereof (e.g., the processor 210), for example, a booting state, a message state, or a charging state. The motor 298 may convert electrical signals into a mechanical vibration and generate a vibration or haptic effect. The electronic device 201 may include a mobile TV supporting device (e.g., a GPU) for processing media data according to standards such as digital multimedia broadcasting (DMB), digital video broadcasting (DVB), or MediaFlo™. Each of the above-described components of the electronic device may be configured with at least one component and the name of a corresponding component may vary according to the kind of electronic device. According to an embodiment of the present disclosure, the electronic device 201 may be configured to include at least one of the above-described components or an additional component, or to not include some of the above-described components. Additionally, some of components in an electronic device are configured as one entity, so that functions of previous corresponding components are performed identically.

Figure 3:
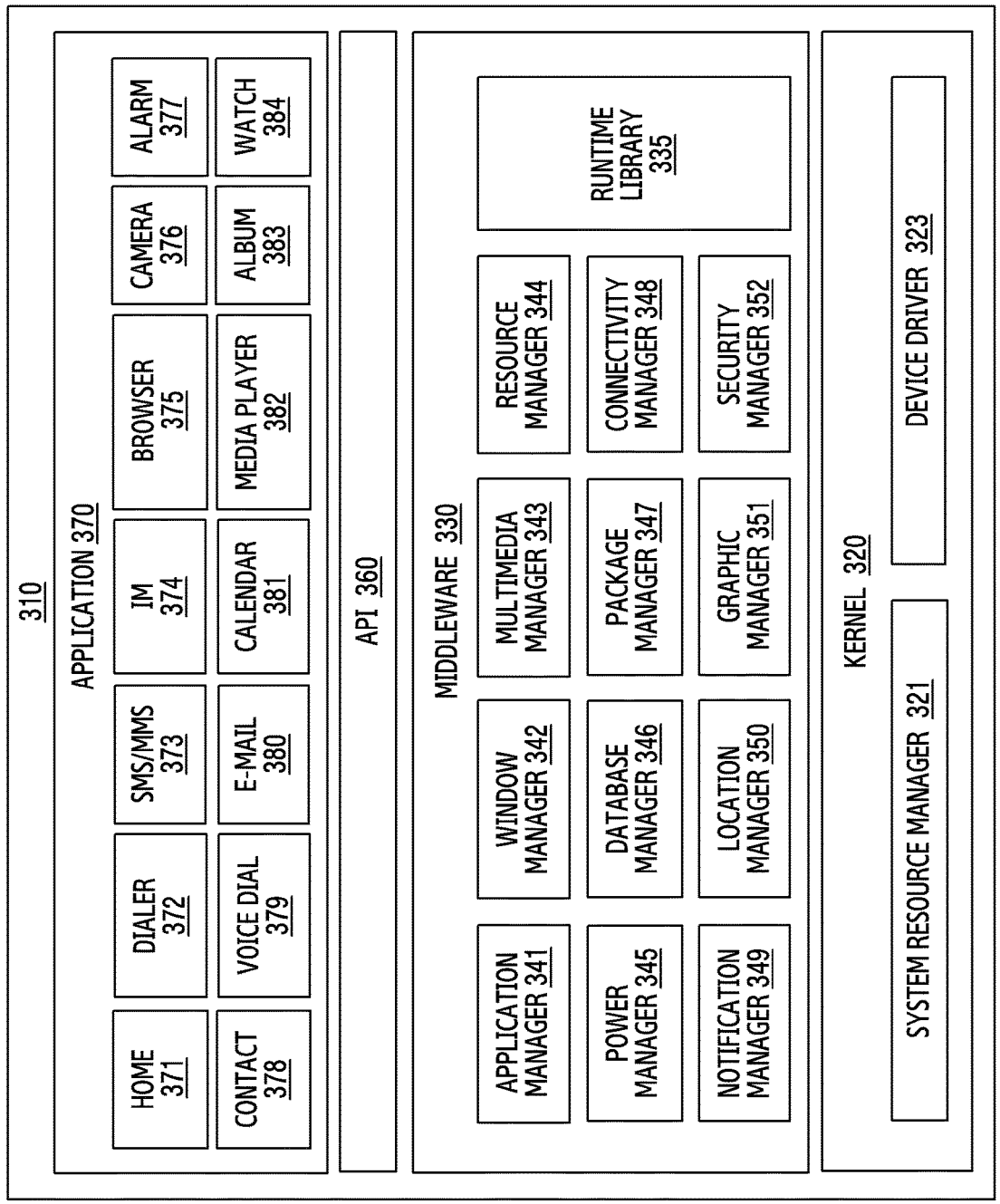
FIG. 3 is a block diagram of a program module according to various embodiments.

FIG. 3 is a block diagram of a program module, according to an embodiment of the present disclosure. A program module 310 (e.g., the program 140) may include an OS for controlling a resource relating to the electronic device 101 and/or the applications 147 running on the OS. The OS may include, for example, Android™, iOS™, Windows™, Symbian™, Tizen™, or Bada™. Referring to FIG. 3, the program module 310 includes a kernel 320 (e.g., the kernel 141), a middleware 330 (e.g., the middleware 143), an API 360 (e.g., the API 145), and/or an application 370 (e.g., the applications 147). At least part of the program module 310 may be preloaded on an electronic device or may be downloaded from an external electronic device (e.g., the first external electronic device 102, the second external electronic device 104, or the server 106).

The kernel 320 includes, for example, at least one of a system resource manager 321 and/or a device driver 323. The system resource manager 321 may control, allocate, or retrieve a system resource. According to an embodiment of the present disclosure, the system resource manager 321 may include a process management unit, a memory management unit, or a file system management unit. The device driver 323 may include, for example, a display driver, a camera driver, a Bluetooth™ driver, a shared memory driver, a USB driver, a keypad driver, a Wi-Fi driver, an audio driver, or an inter-process communication (IPC) driver. The middleware 330, for example, may provide a function commonly required by the application 370, or may provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler to add a new function through a programming language while the application 370 is running. The runtime library 335 may manage input/output, manage memory, or arithmetic function processing. The application manager 341, for example, may manage the life cycle of the applications 370. The window manager 342 may manage a GUI resource used in a screen. The multimedia manager 343 may recognize a format for playing various media files and encode or decode a media file by using the codec in a corresponding format. The resource manager 344 may manage a source code of the application 3740 or a memory space. The power manager 345 may manage the capacity, temperature, and/or power of the battery, and determine or provide power information for an operation of the electronic device using corresponding information among the capacity, temperature, and/or power of the battery. The power manager 345 may operate together with a basic input/output system (BIOS). The database manager 346 may create, search, or modify a database used in the application 370. The package manager 347 may manage installation or updating of an application distributed in a package file format.

The connectivity manager 348 may manage, for example, a wireless connection. The notification manager 349 may provide an event, such as incoming messages, appointments, and proximity alerts, to the user. The location manager 350 may manage location information of an electronic device. The graphic manager 351 may manage a graphic effect to be provided to the user or a user interface relating thereto. The security manager 352 may provide, for example, system security or user authentication. The middleware 330 may include a telephony manager for managing a voice or video call function of the electronic device, or a middleware module for combining various functions of the above-described components. The middleware 330 may provide a module specialized for each type of OS. The middleware 330 may dynamically delete part of the existing components or add new components. The API 360, as a set of API programming functions, may be provided as another configuration according to the OS. For example, Android or iOS may provide one API set for each platform, and Tizen may provide two or more API sets for each platform.

The application 370 includes at least one of a home 371, a dialer 372, an SMS/multimedia messaging system (MIMS) 373, an instant message (IM) 374, a browser 375, a camera 376, an alarm 377, a contact 378, a voice dial 379, an e-mail 380, a calendar 381, a media player 382, an album 383, a clock 384. Additionally, the application 370 may include health care (e.g., measure an exercise amount or blood sugar level), or environmental information (e.g., air pressure, humidity, or temperature information) application. The application 370 may include an information exchange application for supporting information exchange between the electronic device and an external electronic device. The information exchange application may include, for example, a notification relay application for relaying specific information to the external device or a device management application for managing the external electronic device. The notification relay application may relay notification information from another application of the electronic device to an external electronic device, or receive and forward notification information from an external electronic device to the user. The device management application, for example, may install, delete, or update a function (e.g., turn-on/turn off of the external electronic device itself (or some components) or display brightness (or resolution) adjustment) of an external electronic device communicating with the electronic device, or an application operating in the external electronic device. The application 370 may include a specific application (e.g., a health care application of a mobile medical device) according to a property of the external electronic device. The application 370 may include an application received from an external electronic device. At least part of the program module 310 may be implemented (e.g., executed) with software, firmware, hardware (e.g., the processor 210), or a combination of at least two of them, and include a module, a program, a routine, a set of instructions, or a process for executing one or more functions.

Figure 4A:
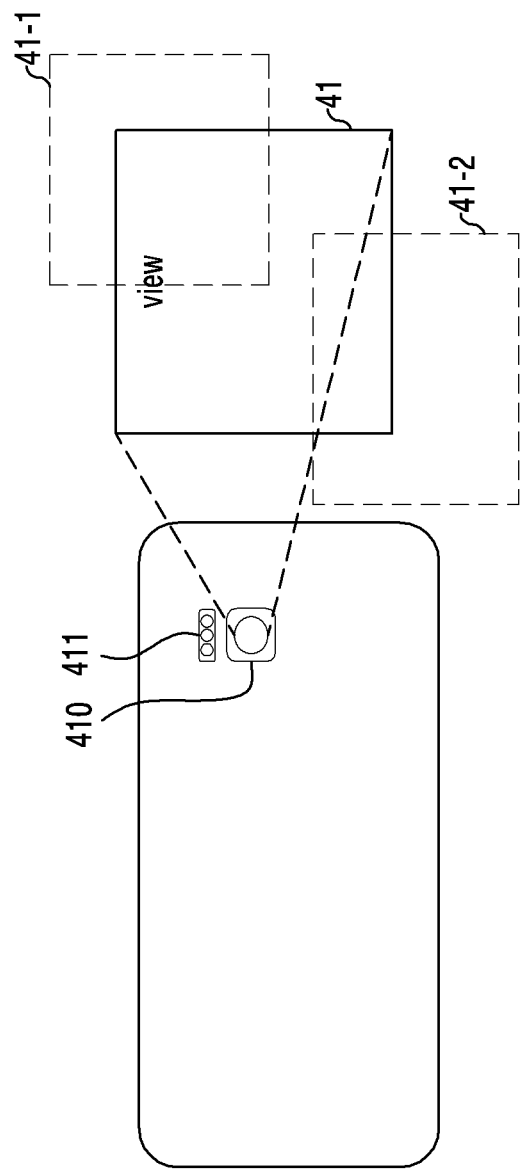
FIG. 4A is a drawing illustrating an electronic device according to an embodiment of the disclosure.

FIG. 4A is a drawing illustrating an electronic device according to an embodiment of the disclosure.

Referring to FIG. 4A, an electronic device (e.g., the electronic device 101, the electronic device 201) according to an embodiment of the disclosure may mount a camera 410 (e.g., the camera module 291) and a flash 411 on a rear side thereof. According to some embodiments, the camera 410 may be located at a front side or lateral side of the electronic device.

The camera 410 according to an embodiment of the disclosure may have a view angle 41 of a configured size, and the view angle 41 of the camera 410 may be moved. For example, the camera 410 may move the view angle 41 as indicated by a reference numeral 41-1 or 41-2 by rotating a mirror (not shown) included therein in a direction of at least one of yaw, pitch, and roll.

Figure 4B:
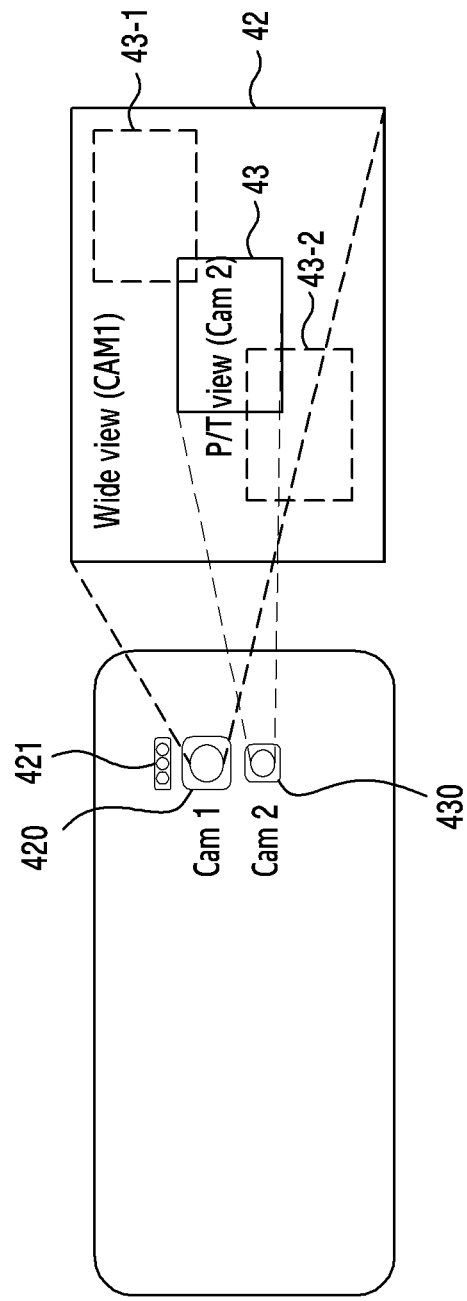
FIG. 4B is a drawing illustrating an electronic device according to another embodiment of the disclosure.

FIG. 4B is a drawing illustrating an electronic device according to another embodiment of the disclosure.

Referring to FIG. 4B, an electronic device (e.g., the electronic device 101, the electronic device 201) according to another embodiment of the disclosure may include a first camera 420, a flash 421, and a second camera 430.

The first camera 420 may be a wide-angle camera or standard camera having a first view angle 42 and incapable of moving the first view angle 42. The first camera 420 may acquire a first image. According to some embodiments, the first camera 420 may move the first view angle.

The second camera 430 may have a second view angle 43 smaller than the first view angle 42, and may move the second view angle 43 by rotating a mirror (not shown). For example, the second camera 430 may be a standard camera or a telephoto camera. The second camera 430 may move the second view angle 43 within a range of the first view angle 42. For example, the second view angle 43 of the second camera 430 may be moved as indicated by a reference numeral 43-1 or 43-2 in accordance with rotation of the mirror. The second camera 430 may acquire a second image corresponding to at least some objects or at least some regions selected from subjects included in the first image acquired via the first camera 420. According to some embodiments, the second camera 430 may acquire the second image by tracking the selected object.

Figure 4C:
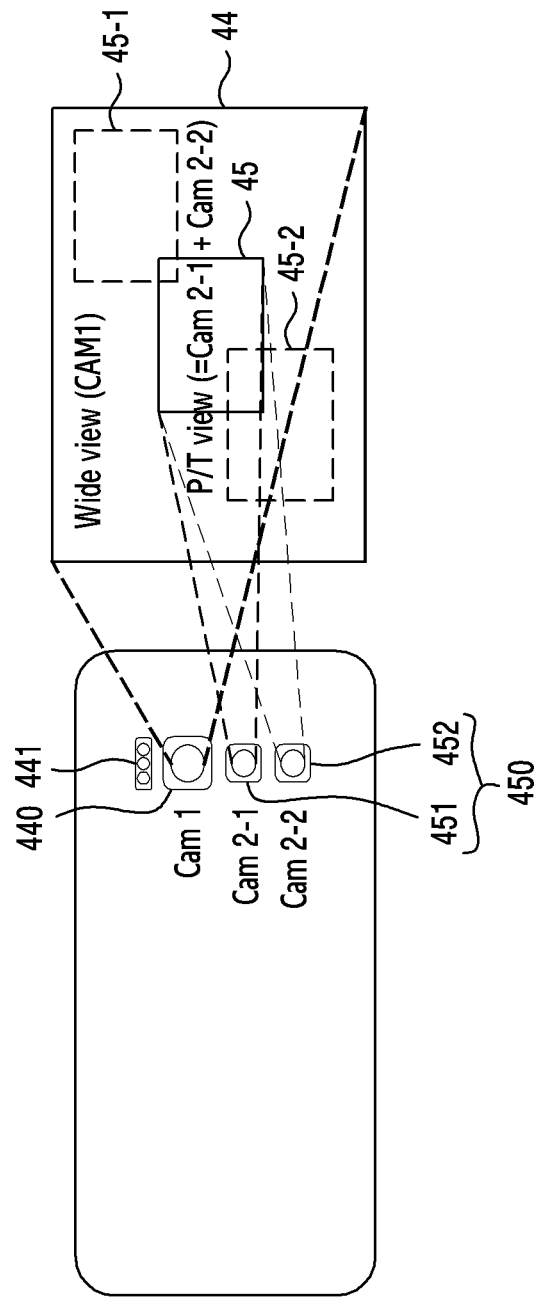
FIG. 4C is a drawing illustrating an electronic device according to another embodiment of the disclosure.

FIG. 4C is a drawing illustrating an electronic device according to another embodiment of the disclosure.

Referring to FIG. 4C, an electronic device (e.g., the electronic device 101, the electronic device 201) according to another embodiment of the disclosure may include a first camera 440, a flash 441, and a second camera 450.

The first camera 440 may be a wide-angle camera or standard camera having a first view angle 44 and incapable of moving the first view angle 44. The first camera 440 may acquire a first image. According to some embodiments, the first camera 440 may move the first view angle 44.

The second camera 450 may be a standard camera or telephoto camera having a second view angle 45 smaller than the first view angle 44. The second camera 450 according to an embodiment of the disclosure may include an RGB camera 451 and a mono camera 452. The RGB camera 451 and the mono camera 452 may have the same second view angle 45, and the second view angle 45 may be moved as indicated by a reference numeral 45-1 and 45-2 in accordance with rotation of a mirror (not shown).

The RGB camera 451 and the mono camera 452 may include an image sensor configured to receive light of at least a different wavelength. For example, the RGB camera 451 may acquire color information and color sharpness, and the mono camera 452 may acquire a detail of contrast. The second camera 450 may acquire the second image by adding color information acquired via the RGB camera 451 to the image acquired via the mono camera 452.

Figure 5A:
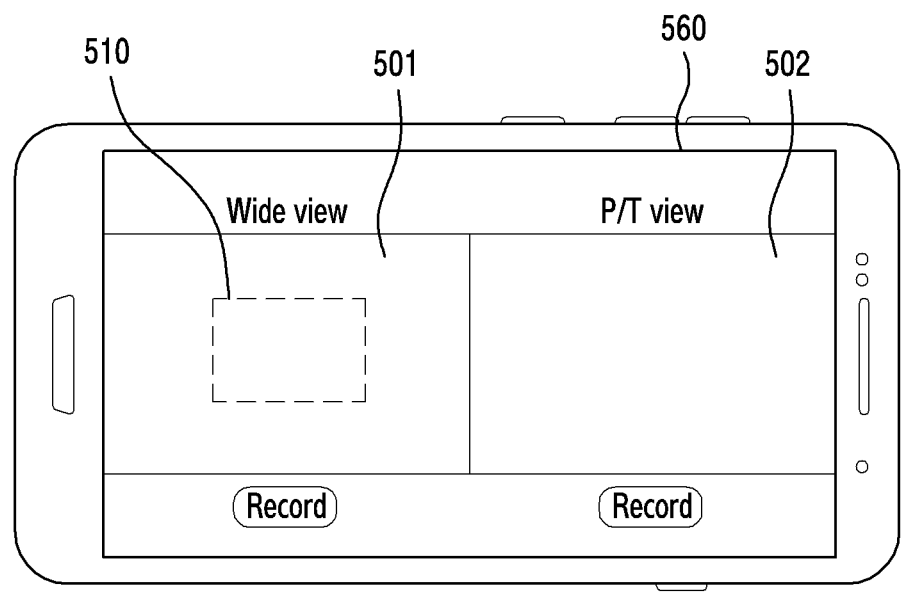
FIG. 5A is a drawing illustrating a user interface of an electronic device according to an embodiment of the disclosure.

FIG. 5A is a drawing illustrating a user interface of an electronic device according to an embodiment of the disclosure.

Referring to FIG. 5A, an electronic device (e.g., the electronic device 101, the electronic device 201) according to an embodiment of the disclosure may display a first image and a second image acquired respectively via a first camera and a second camera on a display 560 in a multi-view (e.g., a dual-view) or Picture By Picture (PBP) manner at a request of capturing a photo or a moving image. For example, the electronic device may display the first image acquired via the first camera on the first region 501, and may display the second image acquired via the second camera on the second region 502. According to some embodiments, the electronic device may display the first image acquired via the first camera on the second region 502, and may display the second image acquired via the second camera on the first region 501.

The first region 501 and the second region 502 may have the same size. According to some embodiments, the first region 501 and the second region 502 may have different sizes. According to another embodiment, the sizes of the first region 501 and the second region 502 may be changed freely by a user.

According to some embodiments, the electronic device may change (switch) images displayed on the first region 501 and the second region 502 at a request (command) of the user.

As a preview image, the first image and the second image may be selectively captured or recorded. For example, the first image and the second image may be captured or recorded upon inputting a capturing or recording menu key located around (or inside) the first region 501 and second region 502 or a physical button located at a housing of the electronic device.

The second image may be an image corresponding to at least some objects or some regions selected from at least one object included in the first image. The electronic device may display a graphic indicator 510 indicating a location corresponding to the second image in at least part of the first image displayed on the first region 501. The user may easily recognize a capturing range of the second camera by using the indicator 510.

According to some embodiments, the electronic device may acquire the second image by tracking the selected object while moving a view angle of the second camera. If the object is out of a view angle range in which the object can move, the electronic device may provide an alarm message in various manners (e.g., visual, auditory, tactile, etc.).

Figure 5B:
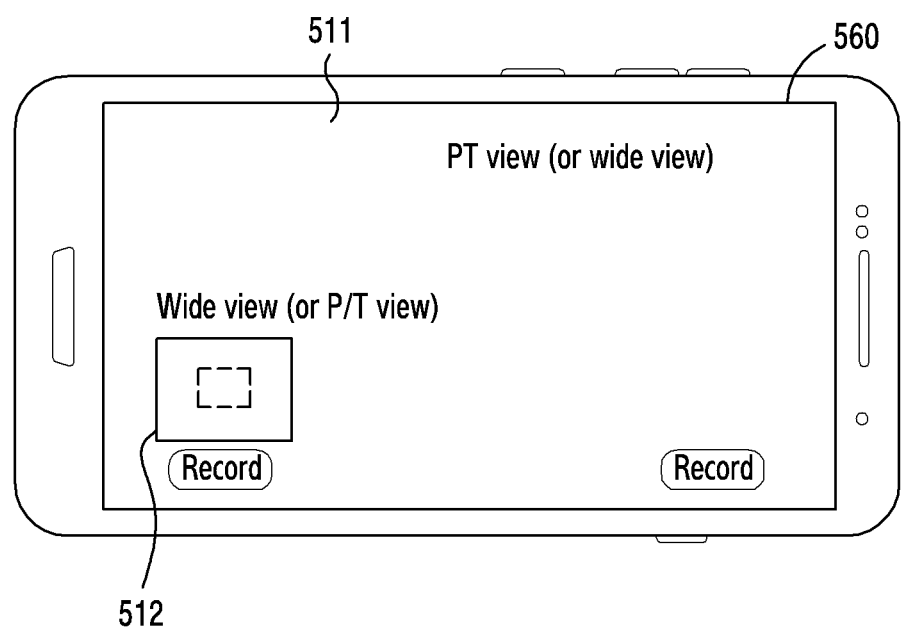
FIG. 5B is a drawing illustrating a user interface of an electronic device according to another embodiment of the disclosure.

FIG. 5B is a drawing illustrating a user interface of an electronic device according to another embodiment of the disclosure.

Referring to FIG. 5B, an electronic device (e.g., the electronic device 101, the electronic device 201) according to an embodiment of the disclosure may display a first image and a second image acquired respectively via a first camera and a second camera on the display 560 in a PIP manner. For example, the electronic device may display the second image acquired via the second camera on a full screen 511, and may display the first image acquired via the first camera on a secondary screen 512. According to some embodiments, the electronic device may display the first image acquired via the first camera on the full screen 511, and may display the second image acquired via the second camera on the secondary screen 512.

A size and location of the secondary screen 512 can be changed by a user. An image displayed on the full screen 511 and secondary screen 512 may be changed with each other by the user. The first image and the second image may be selectively captured or recorded.

According to an embodiment, the user of the electronic device may utilize the first camera as a view finger (e.g., an Electrical View Finger (EVF)). For example, the user of the electronic device may identify an approximate capturing location by using the first image acquired via the first camera, and may select (e.g., touch) a specific object or region of the first image to capture the selected object or location via the second camera. In this case, the electronic device may rotate a mirror of the second camera so that a view angle of the second camera faces the selected object or location.

Figure 5C:
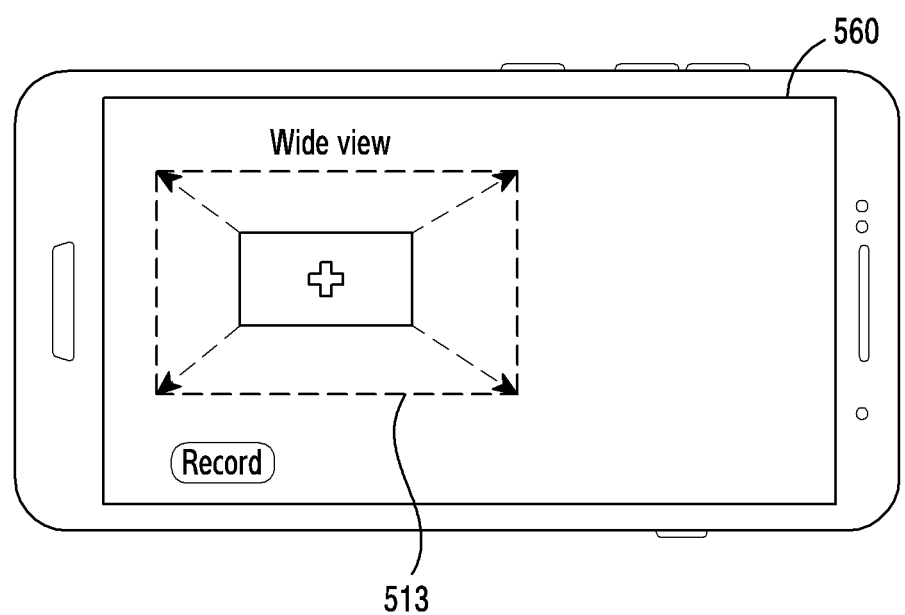
FIG. 5C is a drawing illustrating a user interface of an electronic device according to another embodiment of the disclosure.

FIG. 5C is a drawing illustrating a user interface of an electronic device according to another embodiment of the disclosure.

Referring to FIG. 5C, an electronic device (e.g., the electronic device 101, the electronic device 201) according to an embodiment of the disclosure may display a first image and a second image acquired respectively via a first camera and a second camera on the display 560 in a toggle manner. For example, the electronic device may display the second image on a full screen upon sensing an input (e.g., a toggle button touch, a gesture input, etc.) configured in a state where the first image is displayed on the full screen, and may display again the first image on the full screen upon sensing the configuration input again.

According to an embodiment, the electronic device may provide a zoom-in/out function of the first image by using digital zoom and an optical zoom. For example, the electronic device may enlarge the first image by using the digital zoom function when zoom-in is requested at a specific location of the first image as indicated by a reference numeral 513. The electronic device may move a view angle of the second camera so that the second camera captures the specific location.

The electronic device may provide the zoom-in function for the first image by using an optical zoom function of the second camera when the first image is enlarged to a size corresponding to the second image acquired via the second camera. The electronic device may provide the zoom-in function through digital-zoom of the second camera when zoom-in is requested equal to or higher than optical zoom capability of the second camera. For example, it is assumed that the first camera provides only digital zoom, a 5× zoom image of the first image corresponds to the second image, and the second camera provides a 3× optical zoom and 10× digital zoom function of the second camera. Under this assumption, the electronic device may provide a 2× to 5× zoom image of the first image through the digital zoom function of the first camera. According to some embodiments, the electronic device may display the second image acquired via the second camera as the 5× zoom image of the first image. The electronic device may provide 6× to 8× zoom images of the first image through the optical zoom function of the second camera, and may provide 9× to 18× zoom images of the first image through the digital zoom function of the second camera.

Figure 6A:
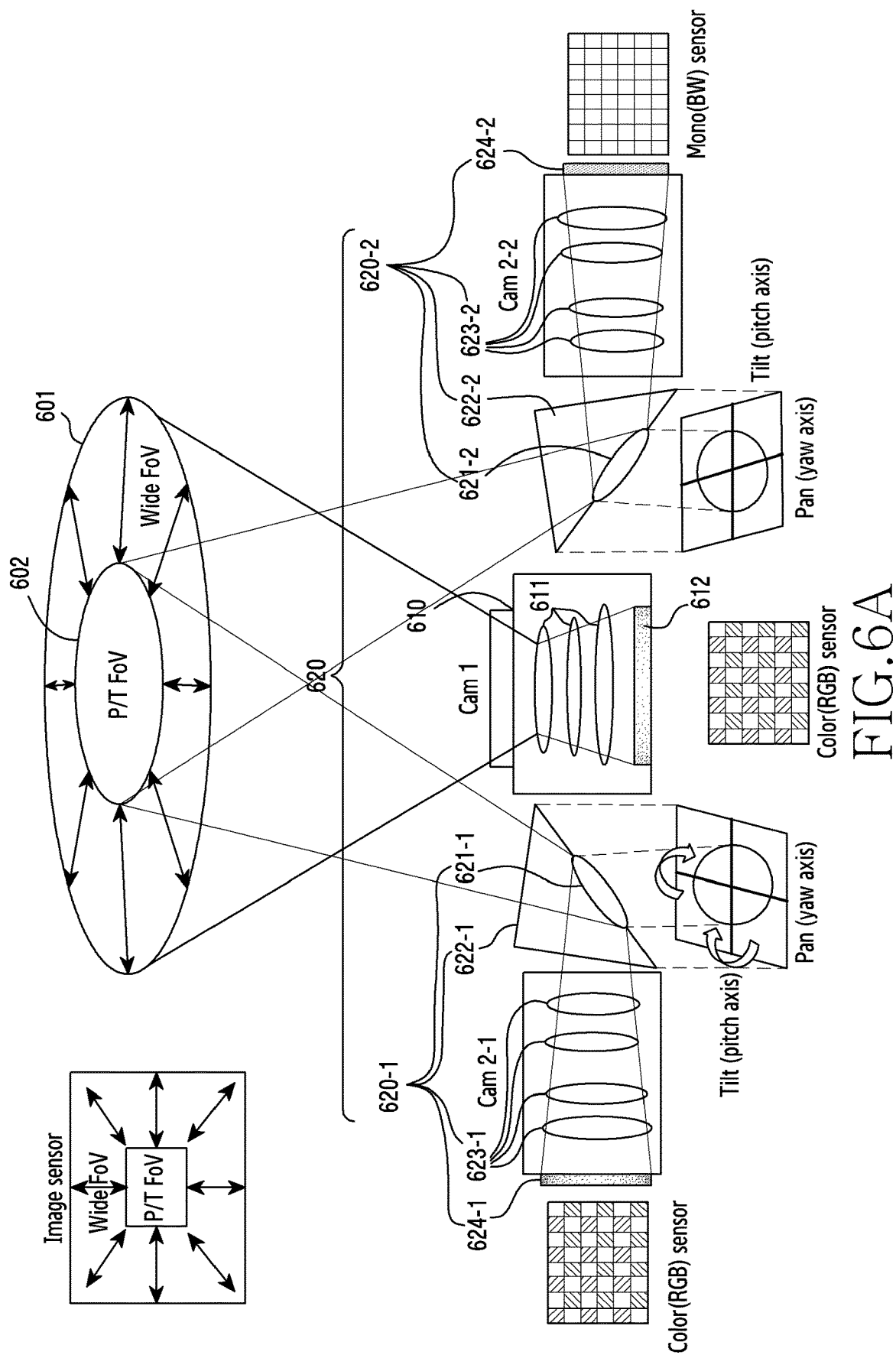
FIG. 6A is a drawing illustrating a structure of a camera module according to an embodiment of the disclosure.
Figure 6B:
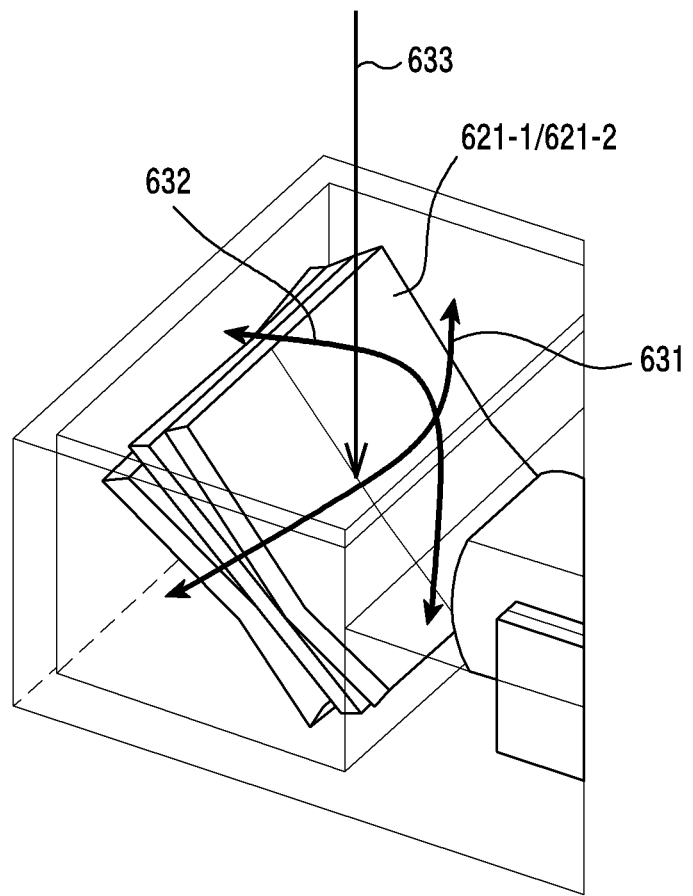
FIG. 6B is a drawing illustrating an example of rotating a mirror according to an embodiment of the disclosure.

FIG. 6A is a drawing illustrating a structure of a camera module according to an embodiment of the disclosure, and FIG. 6B is a drawing illustrating an example of rotating a mirror according to an embodiment of the disclosure.

Referring to FIG. 6A and FIG. 6B, an electronic device (e.g., the electronic device 101, the electronic device 201) according to an embodiment of the disclosure may include a first camera 610 and a second camera 620.

The first camera 610 may not include a mirror, and may have a first view angle 601 (e.g., the first view angle 42 or 44). The first camera 610 may have at least one lens 611 and image sensor 612 arranged (or located) in a direction of an optical axis. A structure of the first camera 610 is not limited thereto, and may have various well-known structures.

The second camera 620 may have a second view angle 602 (e.g., the second view angle 43, 43-1, 43-2, 45, 45-1, or 45-2) smaller than the first view angle 601. The second view angle 602 of the second camera 620 may be moved. For example, the second view angle 602 may be moved within a range of the first view angle 601. However, embodiments of the disclosure are not limited thereto, and the second view angle 602 may be out of the range of the first view angle 601.

The second camera 620 may include an RGB camera 620-1 and a mono camera 620-2.

The RGB camera 620-1 may include a mirror 621-1 (e.g., the mirror 29c) transferring incident light to a lens by changing an optical axis and rotatable in at least one direction, a driving device 622-1 (e.g., the driving device 29*d*) capable of rotating the mirror 621-1 in at least one direction according to at least one rotation axis, at least one lens 623-1 (e.g., the second lens module 29*e*), and a color image sensor 624-1. The mono camera 620-2 may include a mirror 621-2 (e.g., the mirror 29*d*) transferring incident light to a lens by changing an optical axis and rotatable in at least one direction, a driving device 622-2 (e.g., the driving device 29*d*) capable of rotating the mirror 621-2 in at least one direction according to at least one rotation axis, at least one lens 623-2 (e.g., the second lens module 29*e*), and a mono image sensor 624-2.

The mirrors 621-1 and 621-2 (e.g., the mirror 29*c*) may rotate in at least one direction according to at least one rotation axis. For example, as shown in FIG. 6B, the mirrors 621-1 and 621-2 may rotate based on at least one of a yaw axis and a pitch axis on the basis of light 633 to be incident, and thus may rotate in a panning direction 631 and/or a tilt direction 632. The mirrors 621-1 and 621-2 may rotate in a range exceeding an angle (0 degree) parallel to the optical axis and less than an angle (90 degrees) perpendicular to the optical axis.

The driving devices 622-1 and 622-2 (e.g., the driving device 29*d*) may rotate the mirrors 621-1 and 621-2 in at least one direction. The driving devices 622-1 and 622-2 may consist of various well-known devices such as a motor, an actuator, or the like.

At least one of the lenses 623-1 and 623-2 may collect or diffuse the incident light, and may adjust a light amount. At least one of the lenses 623-1 and 623-2 may move along an optical axis changed by the mirrors 621-1 and 621-2 to provide an optical zoom function.

The RGB image sensor 624-1 may convert at least part of light which has passed through at least one lens 623-1 (e.g., light having a first wavelength) into an electric signal to produce a color image. The mono image sensor 624-2 may convert at least part of light which has passed through at least one lens 623-2 (i.e., light having a second wavelength) into an electric signal to produce a mono image. The second camera 620 may produce a second image by combining (mixing) the color image and the mono image. Herein, a technique of acquiring one image (e.g., the second image) by combining images acquired via the RGB camera 620-1 and the mono camera 620-2 is a well-known technique in the technical field of the disclosure, and thus detailed descriptions thereof will be omitted.

The electronic device according to various embodiments of the disclosure may decrease a size of the mirrors 621-1 and 621-2 in comparison with a single camera since the second camera 620 is implemented with a multi-camera. The second camera 620 according to an embodiment of the disclosure may be mounted on a slim-sized electronic device.

Figure 7:
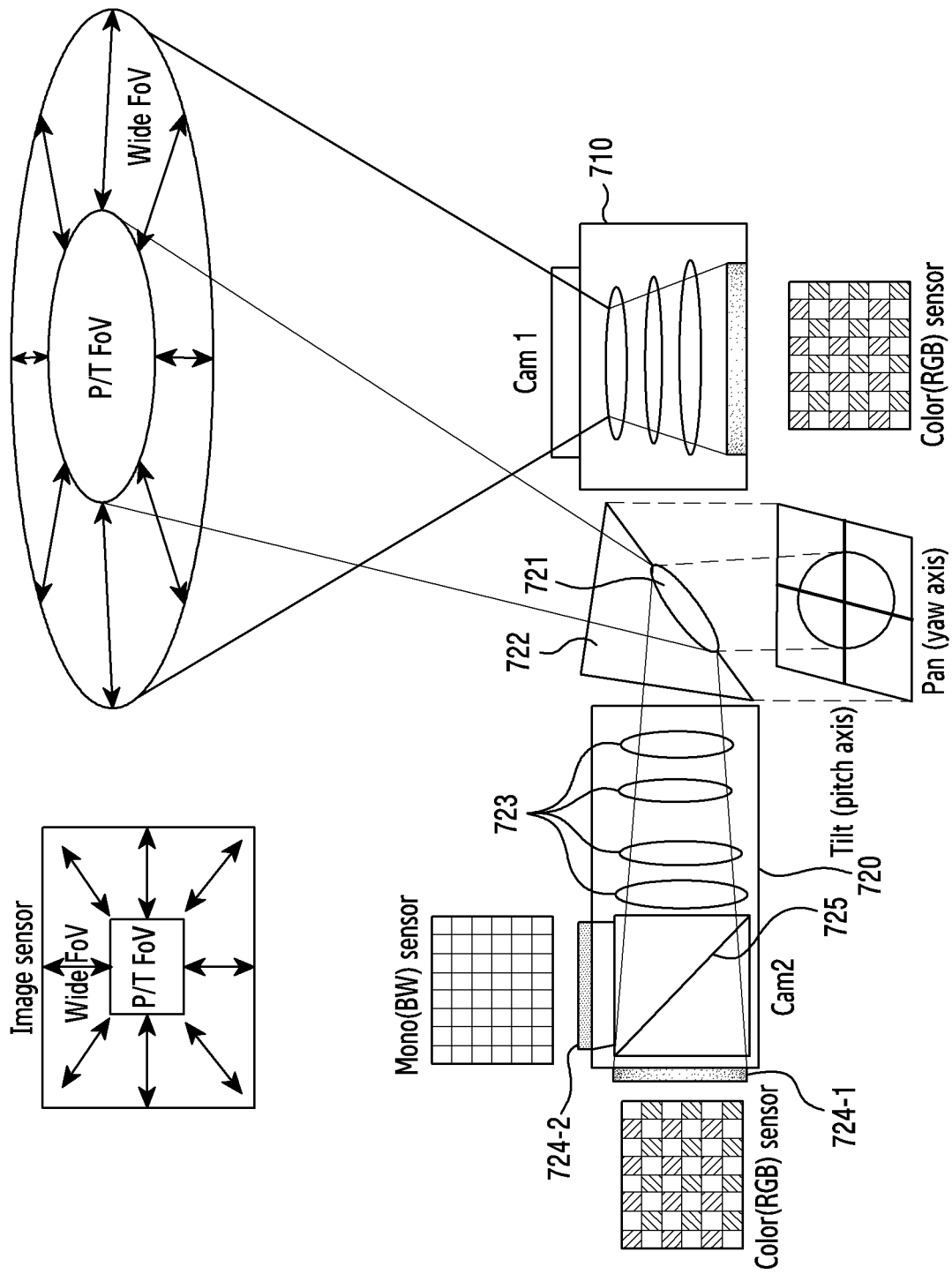
FIG. 7 is a drawing illustrating a structure of a camera module according to various embodiments of the disclosure.

FIG. 7 is a drawing illustrating a structure of a camera module according to various embodiments of the disclosure.

Referring to FIG. 7, an electronic device (e.g., the electronic device 101, the electronic device 201) according to an embodiment of the disclosure may include a first camera 710 and a second camera 720.

The first camera 710 is similar to the first camera 610 of FIG. 6. Detailed descriptions thereof will be omitted.

The second camera 720 may include a mirror 721 transferring incident light to a lens by changing an optical axis and rotatable in at least one direction, a driving device 722 capable of rotating the mirror 721 in at least one direction according to at least one rotation axis, at least one lens 723, an RGB image sensor 724-1, a mono image sensor 724-2, and a light splitting element 725.

The mirror 721, the drive unit 722, and the lens 723 are similar to the mirrors 621-1, 621-2, driving devices 622-1 and 622-2, and at least one of lens 623-1 and 623-2 of FIG. 6A. Detailed descriptions thereof will be omitted.

The light splitting element 725 may split light incident through the lens 723 at a configured ratio, and may transfer the split light to each of the RGB image sensor 724-1 and the mono image sensor 724-2. For example, the light splitting element 725 may pass a first part of light which has transmitted through the lens 723 and transfer it to the RGB image sensor 724-1, and may reflect a second part and transfer it to the mono image sensor 724-2.

The light splitting element 725 may split the light at the same ratio or a different ratio. Examples of the light splitting element 725 may include a beam splitter, a dichroic mirror, a prism, a half mirror, or the like.

The RGB image sensor 724-1 may be disposed on a movement path of the first part of the light transmitted through the lens 723, and the mono image sensor 724-2 may be disposed on a movement path of the second part of the light transmitted through the lens 723. The RGB image sensor 724-1 and the mono image sensor 724-2 may receive part of the incident light (light having different wavelengths and split by the light splitting element 725) to acquire a color image and a mono image. The second camera 720 may combine the color image and the mono image to produce a second image.

According to some embodiments, the RGB image sensor 724-1 and the mono image sensor 724-2 may have different resolutions. For example, the number of pixels of the RGB image sensor 724-1 may be less than the number of pixels of the mono image sensor 724-2. This is because the color information has relatively less effect on image quality.

In an embodiment of the disclosure, the RGB image sensor 724-1 or mono image sensor 724-2 of the second camera 720 may use in common the mirror 721, the driving device 722, and the lens 723, thereby decreasing the number of components and decreasing a mounting space of the second camera 720. In addition, in an embodiment of the disclosure, the RGB image sensor 724-1 and the mono image sensor 724-2 use in common the mirror 723, the driving device 722, and the lens 723, thereby preventing image deviation which may occur when driven separately as shown in FIG. 6A. In addition, in an embodiment of the disclosure, since a problem such as disparity, occlusion, or the like which may occur when matching an image acquired by a multi or dual camera is solved, a load of a processor (or an Image Signal processor (ISP)) depending on image registration, image rectification, or the like can be decreased, thereby improving image quality.

An electronic device (e.g., the electronic device 101, the electronic device 201) may include a first camera (e.g., the first camera 29-1, the first camera 410, the first camera 420, the first camera 440, the first camera 610, the first camera 710), a second camera (e.g., the second camera 29-2, the second camera 430, the RGB camera 620-1, the second camera 720) which includes an image sensor (e.g., the second image sensor 29*f,* the color image sensor 624-1, the color image sensor 724-1), a mirror (e.g., the mirror 29-*c*, the mirror 621-1, the mirror 721) for transferring light incident from the outside to the image sensor, and a driving device (e.g., the driving device 29*d*, the driving device 622-1, the driving device 722) capable of rotating the mirror in at least one direction along at least one rotation axis, and which has a view angle smaller than a view angle of the first camera, and at least one processor (e.g., the processor 120, the processor 210). The at least one processor may be configured to acquire a first image including one or more external objects by using the first camera, select at least some objects of the one or more external objects included in the first image or at least some regions of the first image, and acquire a second image in a state where the mirror is rotated by the driving device such that the view angle of the second camera is moved to a location corresponding to the selected at least some objects or at least some regions.

According to various embodiments, the at least one processor may be configured to provide at least one of the first image and the second image via a display (e.g., the display 160, the display 260, the display 560) operatively coupled with the electronic device.

According to various embodiments, the at least one processor may be configured to display a graphic indicator (e.g., the graphic indicator 510) indicating a location corresponding to the second image, in at least part of the first image.

According to various embodiments, the electronic device may further include a third camera (e.g., the mono camera 452, the mono camera 620-2) which includes a different image sensor (e.g., the mono image sensor 624-2, 724-2) configured to receive light of a wavelength at least different from that of the image sensor (e.g., the color image sensors 624-1 724-1), a mirror (e.g., the mirror 621-2) different from the mirror (e.g., the mirror 621-1) for transferring light incident from the outside to the different image sensor, and a driving device (e.g., the driving device 622-2) different from the driving device (e.g., the driving device 622-1) capable of rotating the different mirror in at least one direction along at least one rotation axis, and which has a view angle smaller than the view angle of the first camera (e.g., the RGB camera 451, the RGB camera 620-1). The at least one processor may be configured to acquire the second image by further including an image acquired via the third camera.

According to various embodiments, the second camera (e.g., the second camera 720) may include a mirror (e.g., the mirror 721), a driving device (e.g., the driving device 722) capable of rotating the mirror in at least one direction along at least one rotation axis, at least one lens (e.g., the lens 723) which collects light reflected by the mirror, a light splitting element (e.g., the light splitting element 725) which passes a first part of light transmitted through the at least one lens and which reflects a second part of light, a first image sensor (e.g., the color image sensor 724-1) disposed on a movement path of light of the first part to receive the first part, and a second image sensor (e.g., the mono image sensor 724-2) disposed on a movement path of light of the second part to receive the second part, and configured to receive light of a wavelength at least different from the first image sensor.

According to various embodiments, the light splitting element may be configured to split the incident light so that the first part and the second part have different ratios.

According to various embodiments, a view angle of the second camera may be configured to move within a view angle range of the first camera.

According to various embodiments, the at least one processor may be configured to change a size of an image acquired by an image sensor of the second camera on the basis of a rotation level of the mirror.

According to various embodiments, the electronic device may further include at least one sensor (e.g., the sensor module 240) which senses shaking of the electronic device. The at least one processor may be configured to acquire an image without shaking by rotating the mirror via the driving device, in accordance with shaking of the electronic device.

According to various embodiments, the electronic device may further include at least one sensor (e.g., the sensor module 240) which senses at least one of a movement speed and direction of the electronic device. The at least one processor may be configured to uniformly acquire images by controlling rotation of the mirror on the basis of change of at least one of the sensed movement speed and direction.

A camera device (e.g., the second camera 29-2, the second camera 430, the second camera 720) according to various embodiments of the disclosure may include a mirror (e.g., the mirror 721) which changes a path of light incident from the outside, a driving device (e.g., the driving device 722) configured to rotate the mirror in at least one direction along at least one rotation axis, at least one lens (e.g., the lens module 723) for collecting light reflected via the mirror, a light splitting element (e.g., the light splitting element 725) which passes a first part of the light incident through the at least one lens and reflects a second part, a first image sensor (e.g., the color image sensor 724-1) disposed on a movement path of light of the first part to receive the first part, and a second image sensor disposed on a movement path of the second part to receive the second part and configured to receive light of a wavelength at least different from that of the first image sensor.

According to various embodiments, the light splitting element may be configured to split the incident light so that the first part and the second part have same or different ratios.

According to various embodiments, the first image sensor may be a color image sensor, and the second image sensor may be a mono image sensor.

Figure 8:
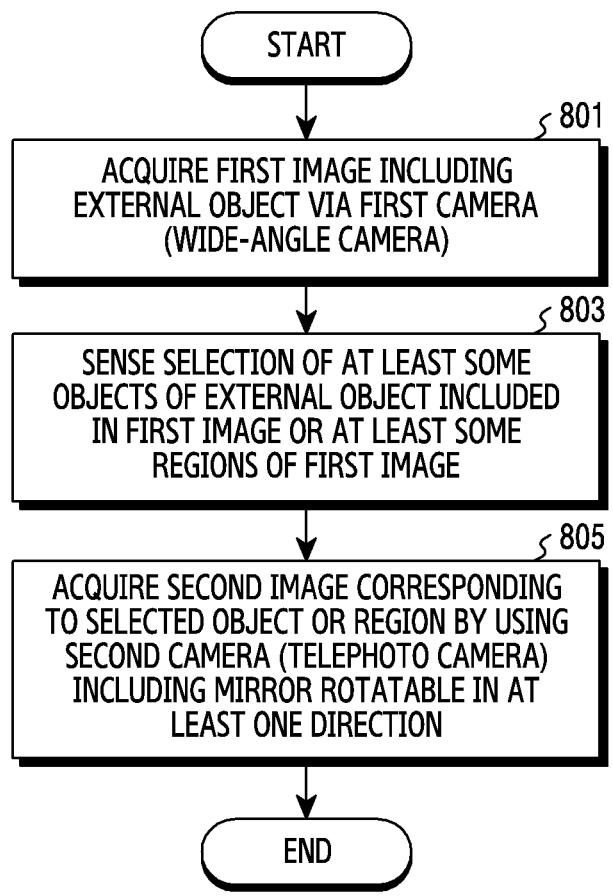
FIG. 8 is a flowchart illustrating a method of acquiring an image of an electronic device according to an embodiment of the disclosure.

FIG. 8 is a flowchart illustrating a method of acquiring an image of an electronic device according to an embodiment of the disclosure.

Referring to FIG. 8, in operation 801, a processor (e.g., the processor 120, the processor 210) of an electronic device (e.g., the electronic device 101, the electronic device 201) according to an embodiment of the disclosure may acquire a first image including an external object via a first camera (e.g., the first camera 29-1, the first camera 410, the first camera 420, the first camera 440, the first camera 610, the first camera 710). For example, the processor may acquire the first image by activating the first camera at a request of capturing a still image (e.g. a photo) or a moving image.

The first camera may be a wide-angle camera having a first view angle. The first camera may be a mirrorless camera incapable of moving a view angle and not including a mirror. According to some embodiments, the first camera may be a mirrorless camera capable of moving a view angle, a mirror camera incapable of moving the view angle, or a mirror camera capable of moving the view angle.

In operation 803, the processor according to an embodiment of the disclosure may sense selection (e.g., touch, gesture, etc.) of at least some regions of the first image or at least some objects of at least one object included in the first image.

In operation 805, the processor according to an embodiment of the disclosure may acquire a second image corresponding to selected at least some objects or at least some regions by activating a second camera (e.g., the second camera 29-2, the second camera 430, the second camera 450, the second camera 620, the second camera 720) including a mirror (e.g., the mirror 29-c, the mirrors 621-1 and 621-2, the mirror 721) rotatable in at least one direction along at least one rotation axis. For example, the processor may acquire the second image by moving a second view angle of the second camera so that the selected objects or some regions are included in the second view angle of the second camera. The processor may rotate the mirror in at least one direction by controlling a driving device (e.g., the driving device 29*d*, the driving devices 622-1 and 622-2, and the driving device 722) to move the second view angle.

The second camera may be a telephoto camera having a second view angle smaller than the first view angle. The second view angle of the second camera may be moved within a range of the first view angle.

As a preview image, as described in FIG. 5A to FIG. 5C, the first image and the second image may be displayed on a display (e.g., the display 160, the display 260, and the display 560) in various manners. The first image and the second image may be stored as a still image or a moving image according to user's selection.

Meanwhile, although not shown in FIG. 8, according to some embodiments, the processor may identify (check) whether a selected object is moved, and may rotate a mirror in accordance with the movement of the selected object to track the selected object.

According to some embodiments, the second camera may be activated together with the first camera at a request of capturing a still image or a moving image.

According to some embodiments, if the processor identifies whether the selected some objects or some regions are included within the second view angle of the second camera, and if the selected some objects or some regions are not included in the second view angle, this may be notified to the user in at least one of visual (e.g., an error message), auditory (e.g., sound effect), and tactile (e.g., vibration) manners.

Figure 9:
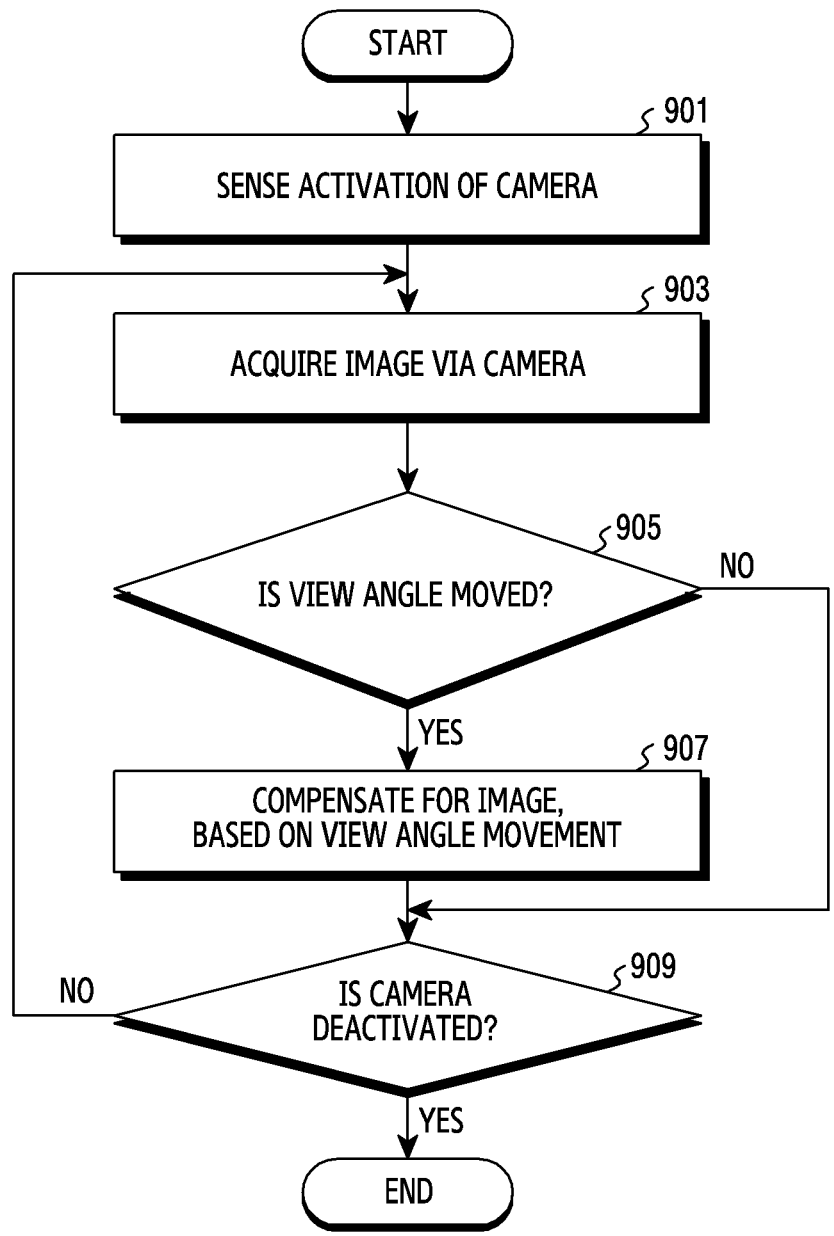
FIG. 9 is a flowchart illustrating a method of compensating for an image of an electronic device according to an embodiment of the disclosure.

FIG. 9 is a flowchart illustrating a method of compensating for an image of an electronic device according to an embodiment of the disclosure.

Referring to FIG. 9, in operation 901, a processor (e.g., the processor 120, the processor 210) of an electronic device (e.g., the electronic device 101, the electronic device 201) according to an embodiment of the disclosure may sense activation of a camera capable of moving a view angle. For example, the processor may identify whether a photo or moving image capturing function is activated.

The camera may move the view angle in accordance with rotation of a mirror rotatable in at least one direction. For example, the camera may be the second camera 29-2 of FIG. 2B, the camera 410 of FIG. 4A, the second camera 430 of FIG. 4B, the second camera 450 of FIG. 4C, the second camera 620 of FIG. 6A, or the second camera 720 of FIG. 7.

In operation 903, the processor according to an embodiment of the disclosure may acquire an image via the camera. The processor may display the acquired image on a display (e.g., the display 160, the display 260, the display 560) as a preview image.

In operation 905, the processor according to an embodiment of the disclosure may identify whether a view angle movement is requested. The view angle movement may be requested by selecting an object or region located outside a view angle or not located at a center of the view angle, or by moving an object being tracked, or by a user's command (e.g., a menu for commanding the view angle movement or a soft button touch or the like).

If it is identified in operation 905 that the view angle movement is not requested, the processor according to an embodiment of the disclosure may proceed to operation 909 described below. Otherwise, if it is identified in operation 905 that the view angle movement is requested, in operation 907, the processor according to an embodiment of the disclosure may compensate for an image on the basis of the view angle movement based on rotation of the mirror. Detailed descriptions on the image compensation method will be described below with reference to FIG. 10 and FIG. 11.

In operation 909, the processor according to an embodiment of the disclosure may identify whether the camera is deactivated. For example, the processor may identify whether a photo or moving image capturing function is deactivated.

If it is identified in operation 909 that the camera is not deactivated, returning to operation 903, the processor according to an embodiment of the disclosure may repeat the aforementioned operations. Otherwise, if it is identified in operation 909 that the camera is deactivated, the processor according to an embodiment of the disclosure may end the method of acquiring the image.

Figure 10:
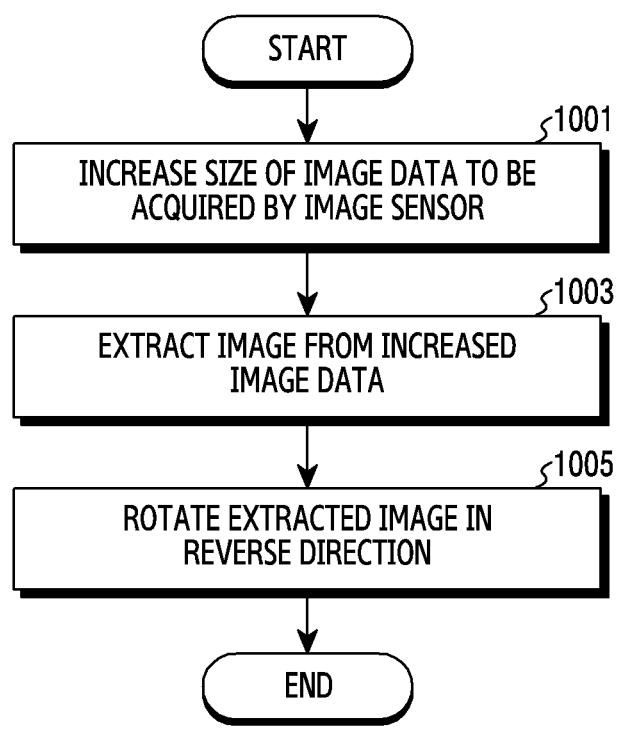
FIG. 10 is a flowchart illustrating a method of compensating for an image of an electronic device according to an embodiment of the disclosure.
Figure 11A:
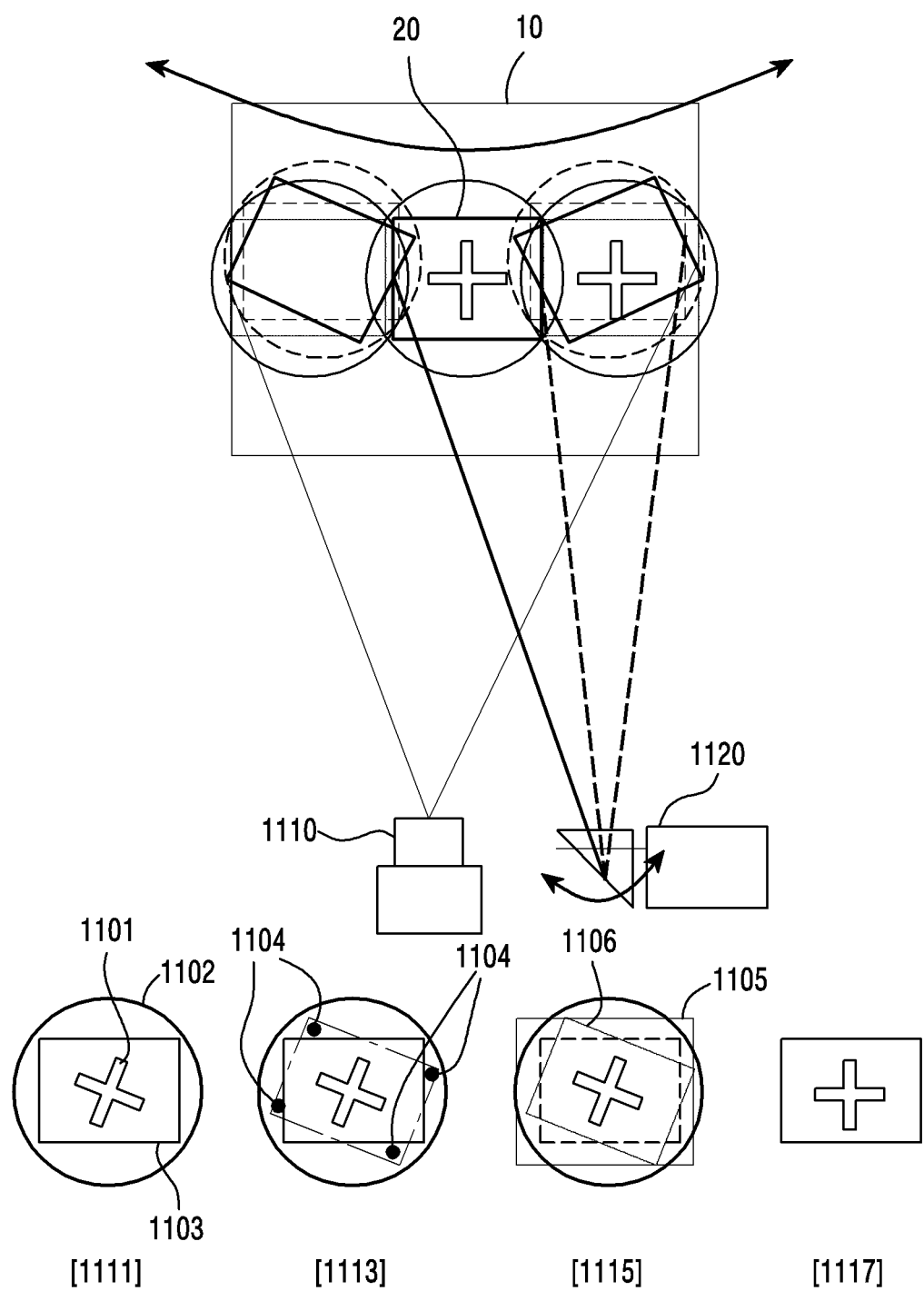
FIG. 11A is a drawing illustrating a method of compensating for an image of an electronic device according to an embodiment of the disclosure.
Figure 11B:
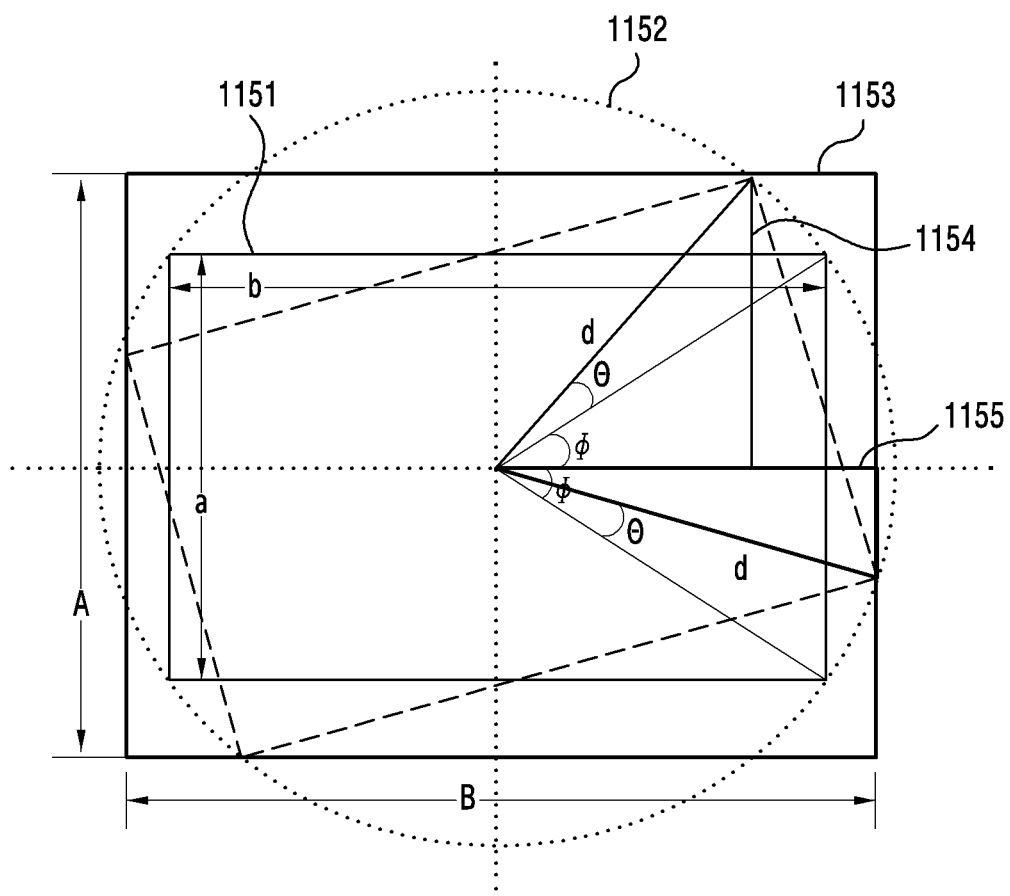
FIG. 11B is a drawing illustrating a method of changing an image size in accordance with rotation of a mirror of an electronic device according to an embodiment of the disclosure.

FIG. 10 is a flowchart illustrating a method of compensating for an image of an electronic device according to an embodiment of the disclosure, FIG. 11A is a drawing illustrating a method of compensating for an image of an electronic device according to an embodiment of the disclosure, and FIG. 11B is a drawing illustrating a method of changing an image size in accordance with rotation of a mirror of an electronic device according to an embodiment of the disclosure.

Before detailed descriptions, a circle of FIG. 11A and FIG. 11B indicates entire image data for light incident via a lens, and a square indicates image data acquired from an image sensor among the entire image data.

Referring to FIG. 10 to FIG. 11B, in operation 1001, upon detecting movement of a view angle (e.g., at a request of rotating a mirror), a processor (e.g., the processor 120, the processor 210) of an electronic device (e.g., the electronic device 101, the electronic device 201) according to an embodiment of the disclosure may increase a size of image data to be acquired by an image sensor (e.g., the second image sensor 29*f*, the color image sensors 624-1 and 724-1, and the mono image sensors 624-2 and 724-2). For example, the processor may increase the size of the image data to be acquired in proportion to a rotation level of the mirror.

Referring to FIG. 11, a second camera 1120 may capture a center of a first image 10 if the mirror does not rotate. A second image 20 acquired by capturing the center of the first image 10 may be a normal image without distortion (without rotation of an object).

However, if a second view angle of the second camera 1120 moves to the right, in the second image acquired via the second camera 1120, an object 1101 may rotate to the right as shown in the figure indicated by a reference numeral 1111. This is because an image rotates while a mirror rotates to move a view angle of the second camera 1120, but an image sensor does not rotate.

In order to compensate for the rotation of the object 1101, as shown in the figure indicated by a reference numeral 1113, the conventional electronic device may crop a distorted second image 1103 in accordance with rotation to the right. However, the image which is cut by using the conventional method may include a region 1104 not having image information.

The processor according to an embodiment of the disclosure may increase a size (or a range) of image data acquired by an image sensor (see 1105) so that the region 1104 in which image information is not acquired does not occur when cropping an image, as shown by the figure indicated by a reference numeral 1115. The image sensor may have a size with which image information cannot be acquired. For example, the image sensor of the second camera 1120 may have a sufficient margin to cover a maximum size of image data to be increased in accordance with rotation of the mirror. The processor may change a size (a range) of image data to be acquired via the image sensor of the second camera 1120 on the basis of rotation of the mirror.

Referring to FIG. 11B, before rotation of the mirror, image data 1151 may have a size of "a (vertical)*b (horizontal)". Herein, assuming that a radius of a circle 1152 is "d", before the rotation, the vertical size a of the image data 1151 may be "2*d*sin φ", and the horizontal size b may be "2*d*cos φ".

Meanwhile, when the mirror rotates by "θ", the processor may increase the size of image data acquired by the image sensor. Herein, referring to a first right-angle triangle 1154 and a second right-angle triangle 1155, it can be known that a vertical size A of the increased image data 1153 is "2*d*sin (φ+θ)", and a horizontal size B is "2*d*cos (φ−θ)".

According to some embodiments, the processor may acquire image data of a maximum size via an image sensor of the second camera 1120, and may change a crop range of the acquired image data in accordance with rotation of the mirror.

According to some embodiments, if a margin of the image sensor of the second camera 1120 is not sufficient and thus there is a region in which image information cannot be acquired even if a size of image data to be acquired is increased, the electronic device may acquire image data of a corresponding portion (e.g., a region not acquired via the second camera 1120) from an image (a first image) acquired via the first camera 1110.

In operation 1003, the processor according to an embodiment of the disclosure may extract an image (a second image) from image data having an increased size.

In operation 1005, the processor according to an embodiment of the disclosure may rotate the extracted image in a reserve direction. For example, as shown in the figure indicated by a reference numeral 1115, the processor may crop the increased image data 1105 in accordance with a rotation direction of a mirror. As shown in the figure indicated by a reference numeral 1117, the processor may rotate the cropped image 1106 in a reserve direction (e.g., to the left) to compensate for distortion caused by rotation of the mirror.

Figure 12A:
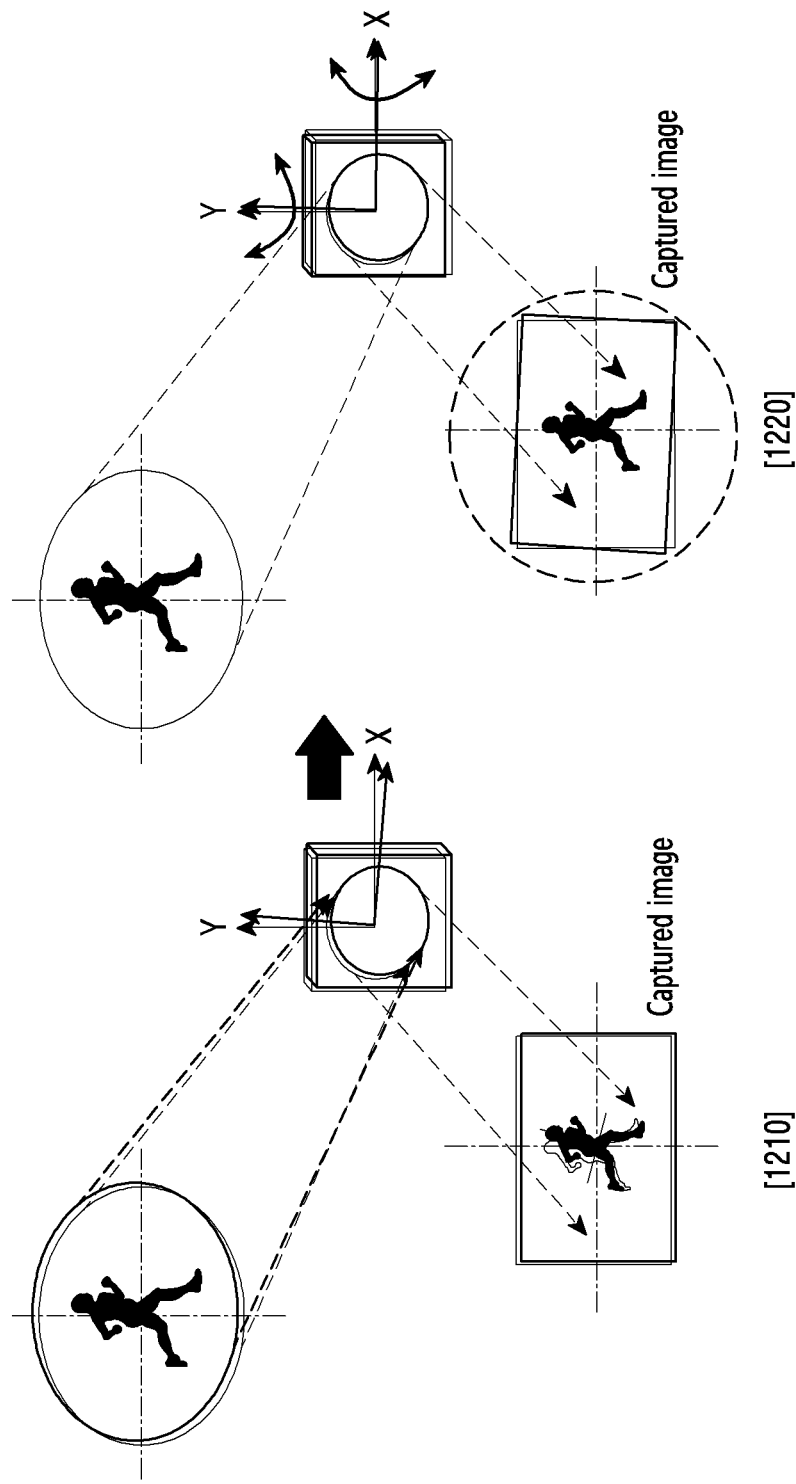
FIG. 12A is a drawing illustrating a hand shaking compensation function of an electronic device according to an embodiment of the disclosure.
Figure 12B:
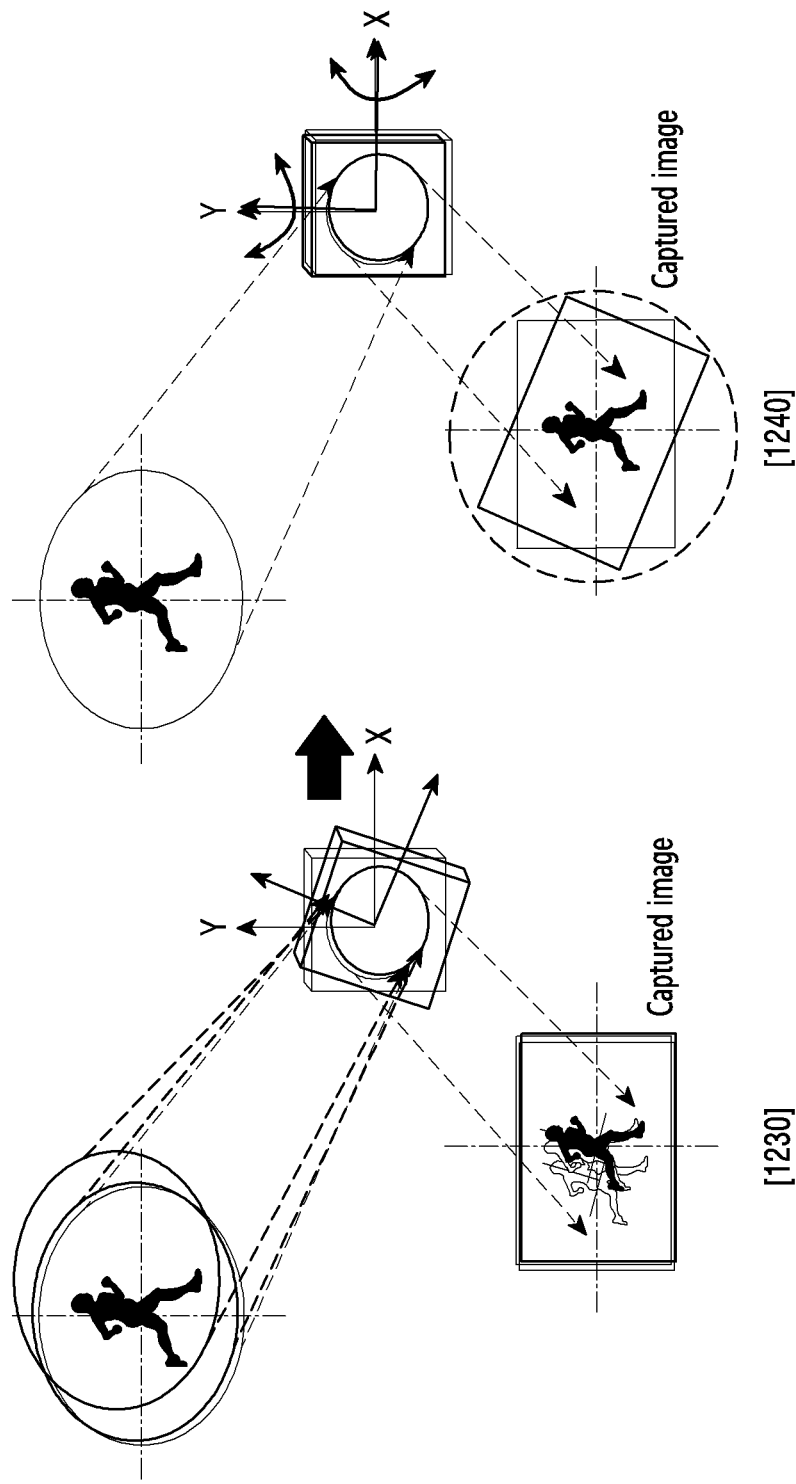
FIG. 12B is a drawing illustrating a gimbal function of an electronic device according to an embodiment of the disclosure.

FIG. 12A is a drawing illustrating a hand shaking compensation function of an electronic device according to an embodiment of the disclosure, and FIG. 12B is a drawing illustrating a gimbal function of an electronic device according to an embodiment of the disclosure.

Referring to FIG. 12A and FIG. 12B, an electronic device according to an embodiment of the disclosure may provide a hand shaking compensation function and gimbal function of a camera by using a rotatable mirror.

When the hand shaking compensation function is not supported, as shown in the figure indicated by a reference numeral 1210, a captured image may be blurred due to hand shaking, thereby deteriorating image quality. However, an embodiment of the disclosure compensates for hand shaking by controlling rotation of a mirror in accordance with the hand shaking as shown in the figure indicated by a reference numeral 1220, thereby preventing the captured image from being blurred and improving image quality.

Similarly, if great shaking occurs such as body shaking when capturing a photo, as shown in the figure indicated by a reference numeral 1230, the captured image may be blurred, thereby significantly decreasing image quality. However, an embodiment of the disclosure may control rotation of a mirror in accordance with body shaking as shown in the figure indicated by a reference numeral 1240, and may compensate for the body shaking by performing image compensation based on rotation of the mirror, thereby preventing the captured image from being blurred and improving image quality. An embodiment of the disclosure may compensate for relatively great shaking of an electronic device such as the body shaking, thereby providing a gimbal function.

Embodiments of the aforementioned disclosure can compensate for at least part of a negative effect (e.g., image shaking) caused by hand shaking or body shaking through rotation of a mirror, without an additional device (e.g., stabilizer) for compensating for hand shaking.

Figure 13:
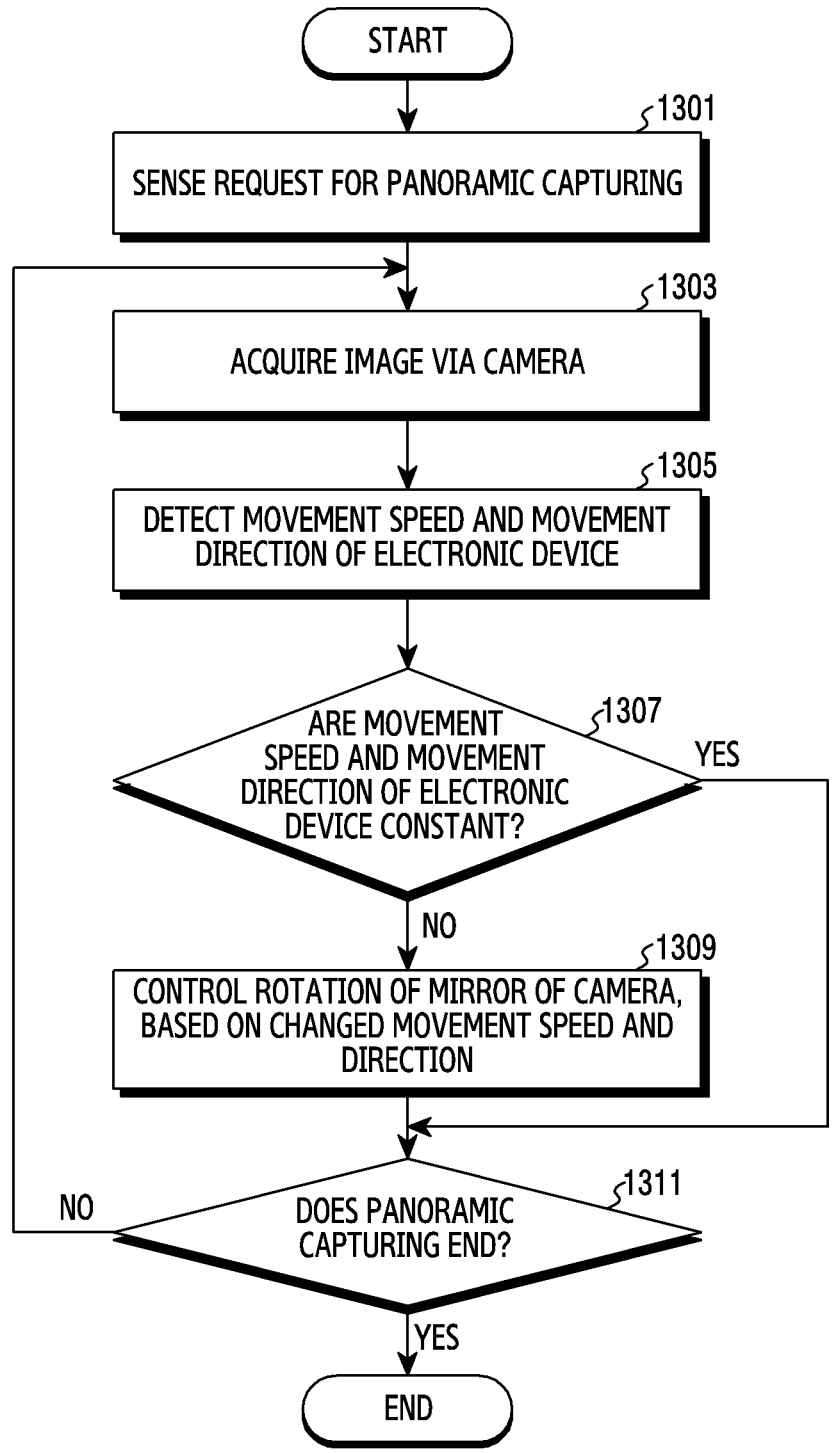
FIG. 13 is a flowchart illustrating a method of capturing a panoramic photo of an electronic device according to an embodiment of the disclosure.

FIG. 13 is a flowchart illustrating a method of capturing a panoramic photo of an electronic device according to an embodiment of the disclosure.

Referring to FIG. 13, in operation 1301, a processor (e.g., the processor 120, the processor 210) of an electronic device (e.g., the electronic device 101, the electronic device 201) according to an embodiment of the disclosure may sense a request for capturing a panoramic photo.

In operation 1303, the processor according to an embodiment of the disclosure may acquire at least one image continuously (e.g., with a specific period) via a camera. The camera may be capable of moving a view angle via a mirror rotatable in at least one direction. For example, the camera may be the second camera 29-2 of FIG. 2B, the camera 410 of FIG. 4A, the second camera 430 of FIG. 4B, the second camera 450 of FIG. 4C, the second camera 620 of FIG. 6A, or the second camera 720 of FIG. 7.

In operation 1305, the processor according to an embodiment of the disclosure may detect a movement speed and movement direction of the electronic device. For example, the processor may detect the movement direction and movement speed of the electronic device via various sensors (e.g., a gyro sensor, a geomagnetic sensor, an acceleration sensor, etc.) included in the electronic device. The operation 1303 and the operation 1305 may be performed simultaneously.

In operation 1307, the processor according to an embodiment of the disclosure may identify whether the movement speed and movement direction of the electronic device are constant.

If it is identified in operation 1307 that the movement speed and movement direction of the electronic device are constant, the processor may proceed to operation 1311 described below. Otherwise, if it is identified in operation 1307 that the movement speed and movement direction of the electronic device are not constant, in operation 1309, the processor may control rotation of a mirror of the camera in association with a change of the movement speed and movement direction. For example, if the movement speed of the electronic device becomes slow, the processor may control rotation of the mirror so that a view angle of the camera moves in the movement direction of the electronic device, and if the speed becomes fast, the processor may control rotation of the mirror so that the view angle of the camera moves in a direction opposite to the movement direction of the electronic device. Accordingly, at least one image may be acquired as if the electronic device moves at a constant speed without shaking in the movement direction.

In operation 1311, the processor according to an embodiment of the disclosure may identify whether panoramic capturing ends.

If it is identified in operation 1311 that the panoramic capturing does not end, proceeding to operation 1303, the processor may repeat the aforementioned operations. If it is identified in operation 1311 that there is a request for ending the panoramic capturing, the processor may end the panoramic capturing, and may combine acquired images to produce a panoramic photo.

Figure 14A:
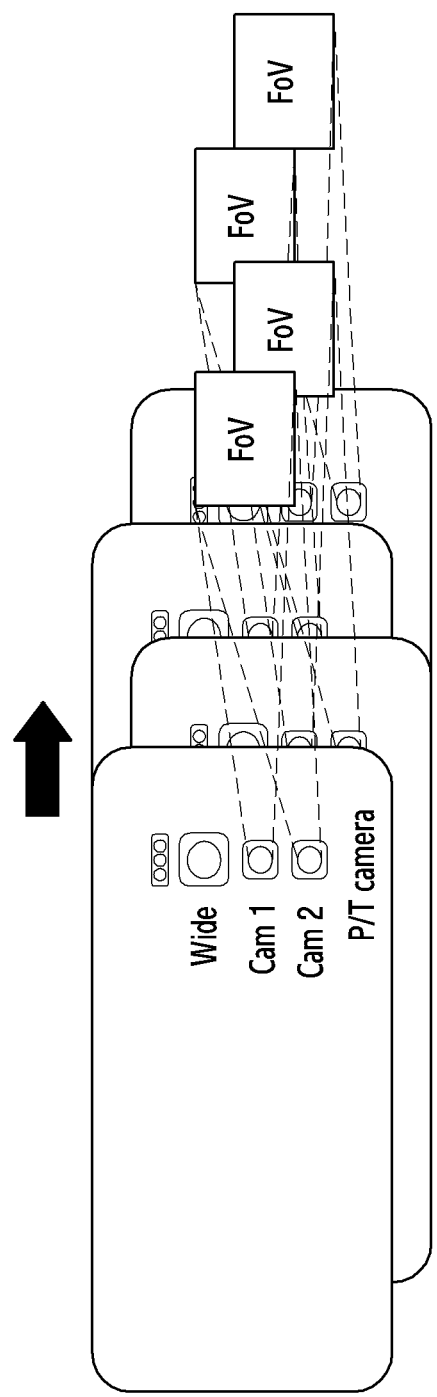
FIG. 14A, FIG. 14B and FIG. 14C are a drawing illustrating a method of capturing a panoramic photo of an electronic device according to an embodiment of the disclosure.
Figure 14B:
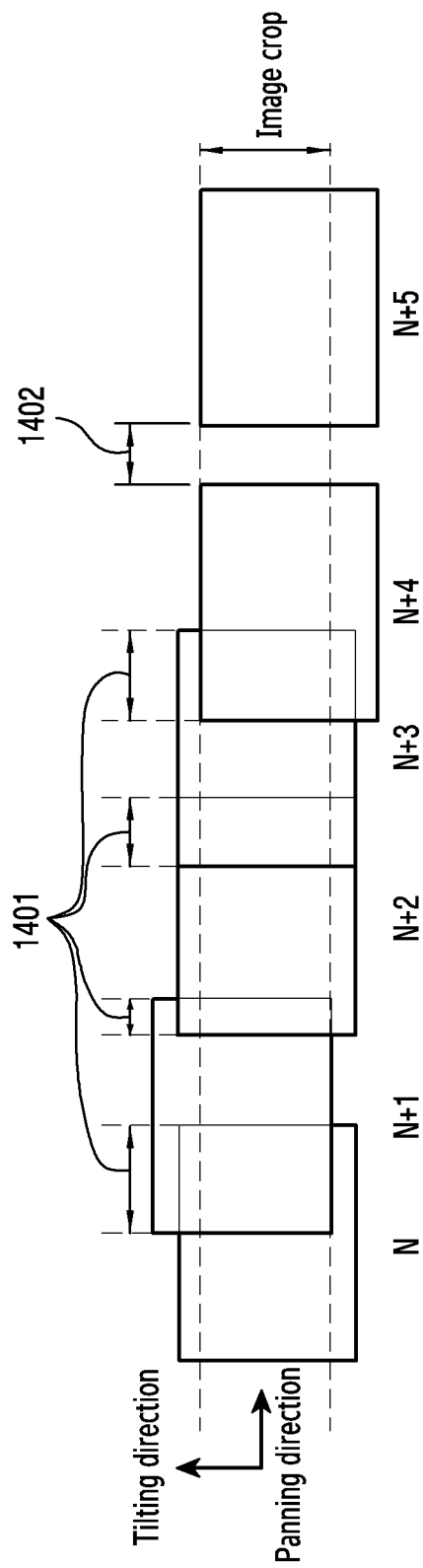
Figure 14C:
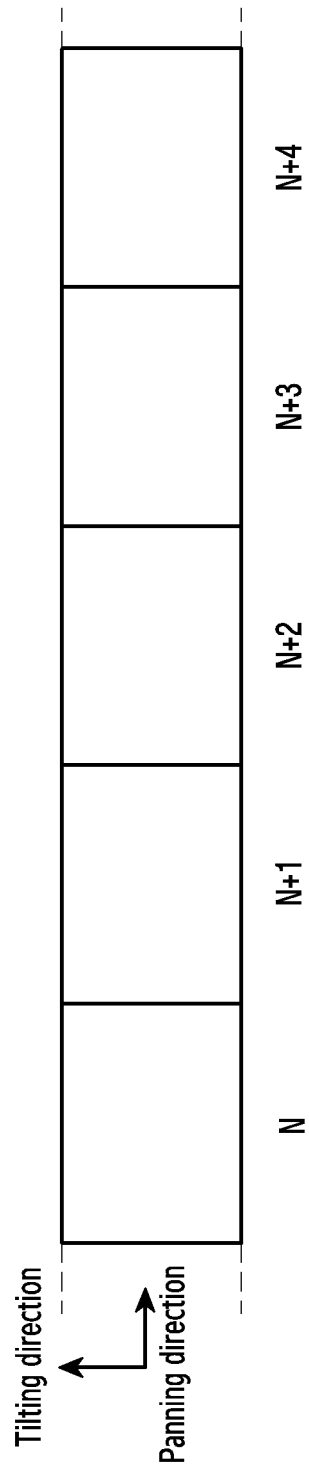

FIG. 14A, FIG. 14B, and FIG. 14C are drawings illustrating a method of capturing a panoramic photo of an electronic device according to an embodiment of the disclosure.

Referring to FIG. 14A to FIG. 14C, a user may move the electronic device in a specific direction (e.g., to the right) when capturing the panoramic photo. When capturing the panoramic photo, as shown in FIG. 14A, the user may have difficulty in moving the electronic device at a specific speed without shaking. For example, the electronic device may be shaken in a vertical direction (e.g., a tilting direction), and the movement speed may not be constant but become fast or slow.

If the movement direction and movement speed of the electronic device are not constant, as shown in FIG. 14B, images acquired continuously by the camera may have a portion 1402 which is not captured or a portion 1401 which is captured in an overlapping (superimposed) manner. The processor may produce a panoramic photo by cutting some regions of the images in a tilting direction (a vertical direction). For example, the processor may produce the panoramic photo by cutting an upper portion of images N, N+2, and N+3, an upper portion of an image N+1, and a lower portion of images N+4 and N+5. As such, the conventional panoramic photo may have an image loss according to the movement direction (shaking) and movement speed of the electronic device.

The electronic device according to an embodiment of the disclosure controls rotation of the mirror included in the camera in association with a change of the movement direction and movement speed of the electronic device. Therefore, as shown in FIG. 14C, images for producing the panoramic photo can be acquired with a specific interval without shaking.

An embodiment of the aforementioned disclosure can prevent a problem in which an overlapping region or empty region is produced when capturing a panoramic photo. In addition, an embodiment of the disclosure can prevent a problem in which part of images has to be cut due to shaking of the electronic device.

A method of acquiring an image of an electronic device (e.g., the electronic device 101, the electronic device 201) according to various embodiments of the disclosure may include acquiring a first image including at least one external object by using a first camera (e.g., the first camera 29-1, the first camera 410, the first camera 420, the first camera 440, the first camera 610, the first camera 710) having a first view angle, sensing selection of at least some objects of at least one external object included in the first image or at least some regions of the first image, and acquiring a second image in a state where the mirror rotates so that a second view angle of a second camera (e.g., the second camera 29-2, the second camera 430, the RGB camera 620-1, the second camera 720) having a second view angle smaller than the first angle and including a mirror (e.g., the mirror 29-c, the mirror 621-1, the mirror 721) rotatable in at least one direction faces a location corresponding to the selected at least some objects or at least some regions.

According to various embodiments, the method may further include displaying at least one of the first image and the second image in at least some regions of a display (e.g., the display 160, the display 260, the display 560).

According to various embodiments, the method may further include displaying a graphic indicator (e.g., the graphic indicator 510) indicating a location corresponding to the second image in at least part of the first image.

According to various embodiments, the acquiring of the second image may include changing a crop range of an image acquired via an image sensor of the second camera on the basis of rotation of the mirror, cropping part of the acquired image in accordance with the changed crop range, and acquiring the second image by reversely rotating the cropped image.

According to various embodiments, the acquiring of the second image may include changing a size of an image acquired via an image sensor of the second camera in proportion to rotation of the mirror, cropping some regions of the image of which the size is changed, and acquiring the second image by reversely rotating the cropped image.

According to various embodiments, the method may further include performing shaking compensation by rotating the mirror in accordance with shaking of the electronic device.

According to various embodiments, the method may further include sensing a request for capturing a panoramic photo, detecting change of at least one of a movement speed and movement direction of the electronic device at a request of capturing a panoramic photo, controlling rotation of the mirror on the basis of the change of at least one of the movement speed and movement direction of the electronic device, and acquiring at least one image for producing the panoramic photo.

The term "module", as used herein, may refer, for example, to a unit including hardware, software, and firmware, or any suitable combination thereof. The term "module" can be interchangeably used with terms such as "unit", "logic", "logical block", "component", "circuit", and the like. A module can be a minimum unit of an integral component or can be a part thereof. A module can be a minimum unit for performing one or more functions or may be a part thereof. A module can be mechanically or electrically implemented. For example, a module, according to an embodiment of the present disclosure, can include, for example, and without limitation, at least one of a dedicated processor, a CPU, an Application-Specific Integrated Circuit (ASIC) chip, a Field-Programmable Gate Arrays (FPGAs), and a programmable-logic device, which are known or will be developed and which perform certain operations.

At least some parts of a device (e.g., modules or functions thereof) or a method (e.g., operations), based on embodiments of the present disclosure, can be implemented with an instruction stored in a non-transitory computer-readable storage medium (e.g., the memory 130, the memory 230) as a program module. When the instruction is executed by a processor (e.g., the processor 120, the processor 210), the processor can perform a function corresponding to the instruction.

The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter.

The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

The embodiments disclosed in the present disclosure are suggested for easy explanation and understanding of the disclosed technical features, and are not intended to limit the scope of the present disclosure. Therefore, the scope of the present disclosure should be interpreted as including all changes or modified forms derived based on the technical idea of the present disclosure.

What is claimed is:

1. An electronic device comprising:
a first camera;
a second camera which includes an image sensor, a mirror for transferring light incident from the outside to the image sensor, and a driving device capable of rotating the mirror in at least one direction along at least one rotation axis, and which has a view angle smaller than a view angle of the first camera; and
at least one processor, wherein the at least one processor is configured to:
acquire a first image including one or more external objects by using the first camera;
select at least some objects of the one or more external objects included in the first image or at least some regions of the first image; and
acquire a second image in a state where the mirror is rotated by the driving device such that the view angle of the second camera is moved to a location corresponding to the selected at least some objects or at least some regions,
wherein the at least one processor is further configured to increase a size of an image acquired by the second camera based on a rotation level of the mirror, crop a portion of the image having the increased size, and acquire the second image by rotating the cropped image such that a distortion caused by a rotation of the mirror is compensated.

2. The electronic device of claim 1, wherein the at least one processor is configured to provide at least one of the first image and the second image via a display operatively coupled with the electronic device.

3. The electronic device of claim 1, wherein the at least one processor is configured to display a graphic indicator indicating a location corresponding to the second image, in at least part of the first image.

4. The electronic device of claim 1, further comprising
a third camera which includes a different image sensor configured to receive light of a wavelength at least different from that of the image sensor, a mirror different from the mirror for transferring light incident from the outside to the different image sensor, and a driving device different from the driving device capable of rotating the different mirror in at least one direction along at least one rotation axis, and which has a view angle smaller than the view angle of the first camera,
wherein the at least one processor is configured to acquire the second image by further including an image acquired via the third camera.

5. The electronic device of claim 1, wherein the second camera comprises:
a mirror;
a driving device capable of rotating the mirror in at least one direction along at least one rotation axis;
at least one lens which collects light reflected by the mirror;
a light splitting element which passes a first part of light transmitted through the at least one lens and which reflects a second part of the light transmitted through the at least one lens;
a first image sensor disposed on a movement path of the first part of the light to receive the first part of the light; and
a second image sensor disposed on a movement path of the second part of the light to receive the second part of the light, and configured to receive light of a wavelength at least different from that of the first image sensor.

6. The electronic device of claim 5, wherein the light splitting element is configured to split the incident light so that the first part and the second part have different ratios.

7. The electronic device of claim 1, wherein a view angle of the second camera is configured to move within a view angle range of the first camera.

8. The electronic device of claim 1, further comprising
at least one sensor which senses shaking of the electronic device,
wherein the at least one processor is configured to acquire an image without shaking by rotating the mirror via the driving device, in accordance with shaking of the electronic device.

9. The electronic device of claim 8, further comprising
at least one sensor which senses at least one of a movement speed and direction of the electronic device,
wherein the at least one processor is configured to uniformly acquire images by controlling rotation of the mirror on the basis of change of at least one of the sensed movement speed and direction.

10. A method of acquiring an image of an electronic device, the method comprising:
acquiring a first image including at least one external object by using a first camera having a first view angle;
sensing selection of at least some objects of at least one external object included in the first image or at least some regions of the first image; and
acquiring a second image in a state where a mirror rotates so that a second view angle of a second camera having a second view angle smaller than the first angle and including a mirror rotatable in at least one direction faces a location corresponding to the selected at least some objects or at least some regions,
wherein the acquiring of the second image comprises increasing a size of an image acquired by the second camera based on a rotation level of the mirror, cropping a portion of the image having the increased size, and acquiring the second image by rotating the cropped image such that a distortion caused by a rotation of the mirror is compensated.

11. The method of claim 10, further comprising:
displaying at least one of the first image and the second image in at least some regions of a display.

12. The method of claim 10, further comprising:
performing shaking compensation by rotating the mirror in accordance with shaking of the electronic device.

13. The method of claim 10, further comprising:
displaying a graphic indicator indicating a location corresponding to the second image in at least part of the first image.

14. The method of claim 10, further comprising:
detecting a request of capturing a panoramic photo;

detecting change of at least one of a movement speed and movement direction of the electronic device; and controlling rotation of the mirror on the basis of the change of at least one of the movement speed and movement direction of the electronic device, and acquiring at least one image for producing the panoramic photo.

15. A camera device comprising:

a mirror which changes a path of light incident from the outside;

a driving device configured to rotate the mirror in at least one direction along at least one rotation axis;

at least one lens configured to collect light reflected via the mirror;

a light splitting element which passes a first part of the light incident through the at least one lens and reflects a second part of the light incident through the at least one lens;

a first image sensor disposed on a movement path of the first part of the light to receive the first part of the light; and a second image sensor disposed on a movement path of the second part of the light to receive the second part of the light and configured to receive light of a wavelength at least different from that of the first image sensor.

16. The camera device of claim 15, wherein the light splitting element is configured to split the incident light so that the first part and the second part have same or different ratios.

17. The camera device of claim 15, wherein the first image sensor is a color image sensor, and the second image sensor is a mono image sensor.

* * * * *